United States Patent
Katayama et al.

(10) Patent No.: US 6,608,622 B1
(45) Date of Patent: *Aug. 19, 2003

(54) MULTI-VIEWPOINT IMAGE PROCESSING METHOD AND APPARATUS

(75) Inventors: Akihiro Katayama, Yokosuka (JP); Hiroaki Sato, Kawasaki (JP); Koichiro Tanaka, Tokyo (JP); Eita Ono, Tokyo (JP); Shinya Urisaka, Kashiwa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/543,121

(22) Filed: Oct. 13, 1995

(30) Foreign Application Priority Data

Oct. 14, 1994 (JP) .............................................. 6-249789
Nov. 25, 1994 (JP) .............................................. 6-291483

(51) Int. Cl.[7] ............................................... G06T 17/00
(52) U.S. Cl. ..................................................... 345/419
(58) Field of Search ................................ 395/119, 120, 395/123, 128; 355/22; 345/419, 420, 423, 428

(56) References Cited

U.S. PATENT DOCUMENTS 4,654,872 A 3/1987 Hisano et al. ............ 358/99 X

FOREIGN PATENT DOCUMENTS

GB 2244621 12/1991

OTHER PUBLICATIONS

EPO 0520179 A2 Taylor*

* cited by examiner

Primary Examiner—Almis R. Jankus
(74) Attorney, Agent, or Firm—Morgan & Finnegan

(57) ABSTRACT

An image processing method according to an embodiment of the present invention has the following steps: the multi-viewpoint image input step for inputting images obtained from a plurality of viewpoint positions arranged on different straight lines, the detection step (2, 7, 17, 8) for detecting a viewpoint position and its view direction in which a user is seeing at the viewpoint position, and the image generation step (11, 12, 13, 8) for generating a virtual image viewed from the predetermined viewpoint by using the images input in the multi-viewpoint image input step on the basis of the detected predetermined viewpoint position and the view direction. In the image generation step, optimal corresponding points are obtained by detecting a straight line having a width on an epipolar plane image corresponding to the input images, thereby generating an image.

44 Claims, 25 Drawing Sheets

FIG. 15 jTH EPI

|   | 1 | 2 | 3 | 4 |
|---|---|---|---|---|
| nx |   |   |   |   |
| ⋮ | ⋮ | ⋮ | ⋮ | ⋮ |
| 13 |   |   |   |   |
| 12 | b1 |   |   |   |
| 11 |   |   |   |   |
| 10 |   |   |   |   |
| 9 |   | b1 |   |   |
| 8 |   |   |   |   |
| 7 |   |   |   |   |
| 6 |   | c2 | b1 |   |
| 5 | a1 | a1 | c2 | c2 |
| 4 |   |   | a1 | a1 |
| 3 |   |   | b1 |   |
| 2 |   |   |   |   |
| 1 |   |   |   |   |

METHOD OF CONSTRUCTING INTERPOLATED IMAGE 2

INTERPOLATED LINE 12
INTERPOLATED LINE 22
INTERPOLATED LINE 32
INTERPOLATED LINE 42
INTERPOLATED LINE 52
INTERPOLATED LINE 62
INTERPOLATED LINE 72

INTERPOLATED LINE j2

INTERPOLATED LINE ny2

MULTI-VIEWPOINT IMAGE PROCESSING METHOD AND APPARATUS

BACKGROUND OF THE INVENTION

1. Field of the Invention

The present invention relates to an image processing method and apparatus and, more particularly, to an image processing apparatus and method which interpolates images obtained by a plurality of image sensing means (e.g., cameras) to generate an image viewed from a viewpoint different from the viewpoints of the image sensing means.

2. Description of the Related Art

As an apparatus for stereoscopically displaying images viewed from a plurality of viewpoints, a stereo display, a lenticular display, and the like are available. The above stereo display is designed to alternately display images obtained by two cameras upon high-speed switching. An observer can observe a stereoscopic image by using shutter glasses or polarization glasses which are synchronized with this high-speed switching operation.

In the lenticular display, for example, images A, B, C, and D obtained by four cameras are arranged in units of pixels, as shown in FIG. 1, provided that the pixel position (1,1) of the first image A is expressed as A (1,1). A sheet called a lenticular sheet obtained by arranging a large number of semicylindrical lenses is bonded to a front surface to allow stereoscopic expression of images viewed from four viewpoints.

In the above conventional apparatus, however, only stereoscopic images in the directions in which the cameras are aimed can be observed. That is, in the stereo display, when an object is photographed while the two cameras are fixed, the observer always sees the same image even if the observer moves his/her viewpoint.

In contrast to this, in the lenticular display, the observer can move his/her viewpoint in the lateral direction. However, the observer can only see images viewed from some of the cameras at intervals. That is, the viewpoint of the observer cannot be continuously moved in the lateral direction or in a space (i.e., the viewpoint cannot be moved to an arbitrary position in a space to aim the viewpoint in an arbitrary direction).

A method of using an epipolar plane image (to be referred to as an EPI hereinafter) is a conventional method of using a plurality of images photographed from a plurality of viewpoint positions to generate images viewed from positions different from the respective photographing positions.

In this method, as shown in FIG. 2, lines (101a, 102a, 103a, 104a) in the respective images (101, 102, 103, 104) at the same position are extracted and synthesized into one image (2000). Straight line detection is then performed on this EPI, and interpolation processing is performed to obtain interpolated lines (101a', 102a', 103a'), thereby obtaining points (corresponding points) corresponding to target points. From each corresponding point, an image viewed from a position different from a photographing position is obtained.

In the above conventional apparatus, a sequence of points forming a straight line on an EPI as discrete data is regarded as corresponding points. For this reason, if, for example, straight lines of the same color appear at equal intervals on an EPI to form a stripped pattern, or thin lines are present in an uniform area, a sequence of points which is not regarded as corresponding points may be mistakenly detected as a straight line. An image therefore is constructed on the basis of information including the erroneous corresponding points, resulting in synthesizing a distorted image, e.g., an image whose forward/backward positional relationship is reversed, or an image having a distorted pattern.

SUMMARY OF THE INVENTION

The present invention has been made in consideration of the above problem, and has as its object to allow smooth movement of the viewpoint position and its view direction of an observer in a space and generate corresponding images.

It is another object of the present invention to provide an image processing apparatus and method which can accurately generate interpolated images in the image interpolation processing required to achieve the above object.

The foregoing object is attained by providing an image processing method comprising: multi-viewpoint image input step for inputting images obtained from a plurality of viewpoint positions arranged on different straight lines; detection step for detecting a viewpoint position and its view direction; and image generation step for generating a virtual image viewed from the predetermined viewpoint by using the images input in the multi-viewpoint image input step on the basis of the detected predetermined viewpoint position and the direction in which the user is seeing at the predetermined viewpoint.

The foregoing object is also attained by providing an image processing method comprising: array detection step for detecting a plurality of arrays of straight lines having widths on an epipolar plane image constituted by a plurality of images photographed from a plurality of viewpoint positions; and corresponding point determination step for determining corresponding points by selecting a wider array from the plurality of arrays.

The foregoing object is also attained by providing an image processing apparatus comprising: multi-viewpoint image input means for inputting images obtained from a plurality of viewpoint positions arranged on different straight lines; detection means for detecting a viewpoint position and its view direction; and image generation means for generating a virtual image viewed from the predetermined viewpoint by using the images input in the multi-viewpoint image input means on the basis of the detected predetermined viewpoint position and the direction in which the user is seeing at the predetermined viewpoint.

The foregoing object is also attained by providing an image processing apparatus comprising: array detection means for detecting a plurality of arrays of straight lines having widths on an epipolar plane image constituted by a plurality of images photographed from a plurality of viewpoint positions; and corresponding point determination means for determining corresponding points by selecting a wider array from the plurality of arrays.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 15 is a view showing detected corresponding points;

DETAILED DESCRIPTION OF THE PREFERRED EMBODIMENTS

Preferred embodiments of the present invention will be described in detail in accordance with accompanying drawings.

Figure 3:
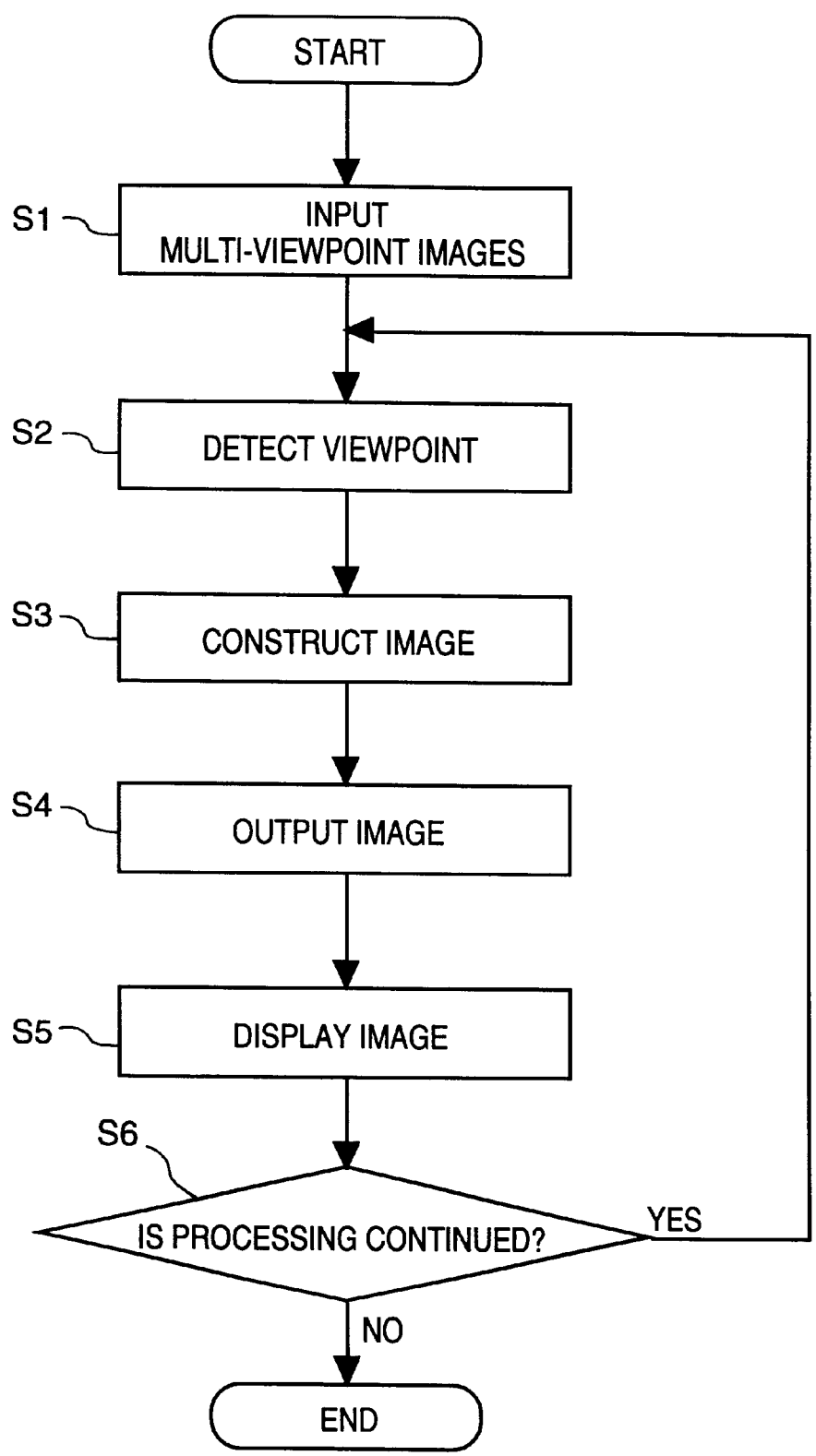
FIG. 3 is a flow chart for explaining an outline of a procedure for an image processing method according to an embodiment of the present invention.
Figure 4:
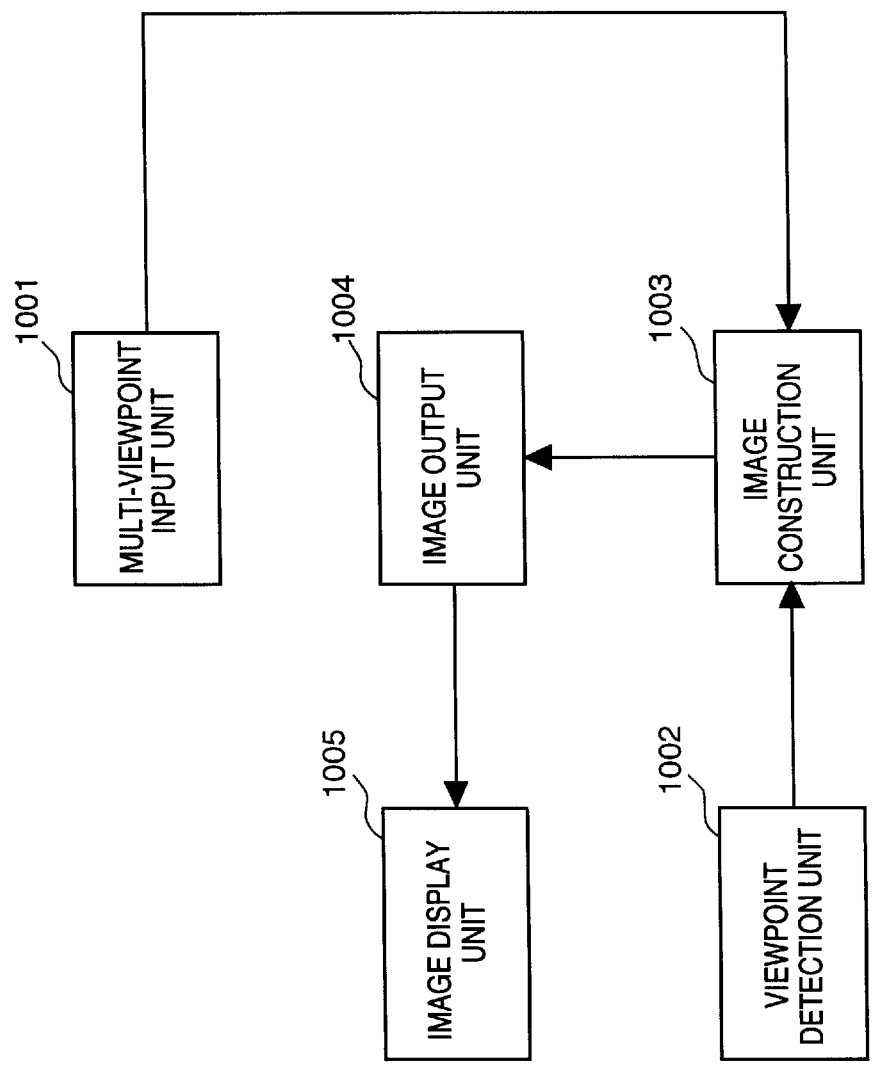
FIG. 4 is a block diagram for explaining the schematic arrangement of an image processing apparatus according to an embodiment of the present invention.

FIG. 3 is a flow chart for explaining an image processing method of the present invention. FIG. 4 is a block diagram showing the schematic arrangement of an image processing apparatus.

As shown in FIG. 3, according to the image processing method of this embodiment, in step S1, multi-viewpoint image input processing is performed to input images obtained from a plurality of viewpoint positions arranged on a plurality of different straight lines.

The flow then advances to step S2 to perform viewpoint detection processing to detect the position of an eye of an observer and the direction in which he/she is seeing.

The flow advances to step S3 to perform image construction processing to construct an image viewed from the viewpoint position detected by the viewpoint detection processing in step S2 by using multi-viewpoint image data (to be described later).

In step S4, the image constructed in step S3 is output through an image output apparatus. In addition, in step S5, the constructed image is displayed on a display screen.

In step S6, it is checked whether to continue the processing. If YES in step S6, the flow returns to step S2 to repeat the above processing. If NO in step S6, the processing is ended.

The above image processing is performed by the image processing apparatus in FIG. 4. Referring to FIG. 4, reference numeral 1001 denotes a multi-viewpoint image input unit for inputting images obtained from a plurality of viewpoint positions arranged on a plurality of different straight lines.

Reference numeral 1002 denotes a viewpoint detection unit for detecting the position of an eye of the observer and the direction in which he/she is seeing; and 1003, an image construction unit for constructing an image viewed from the viewpoint position detected by the viewpoint detection unit 1002 by using multi-viewpoint image data obtained by the multi-viewpoint image input unit 1001.

Reference numeral 1004 denotes an image output unit for outputting the image constructed by the image construction unit 1003. The image output from the image output unit 1004 is displayed on an image display unit 1005.

Figure 2:
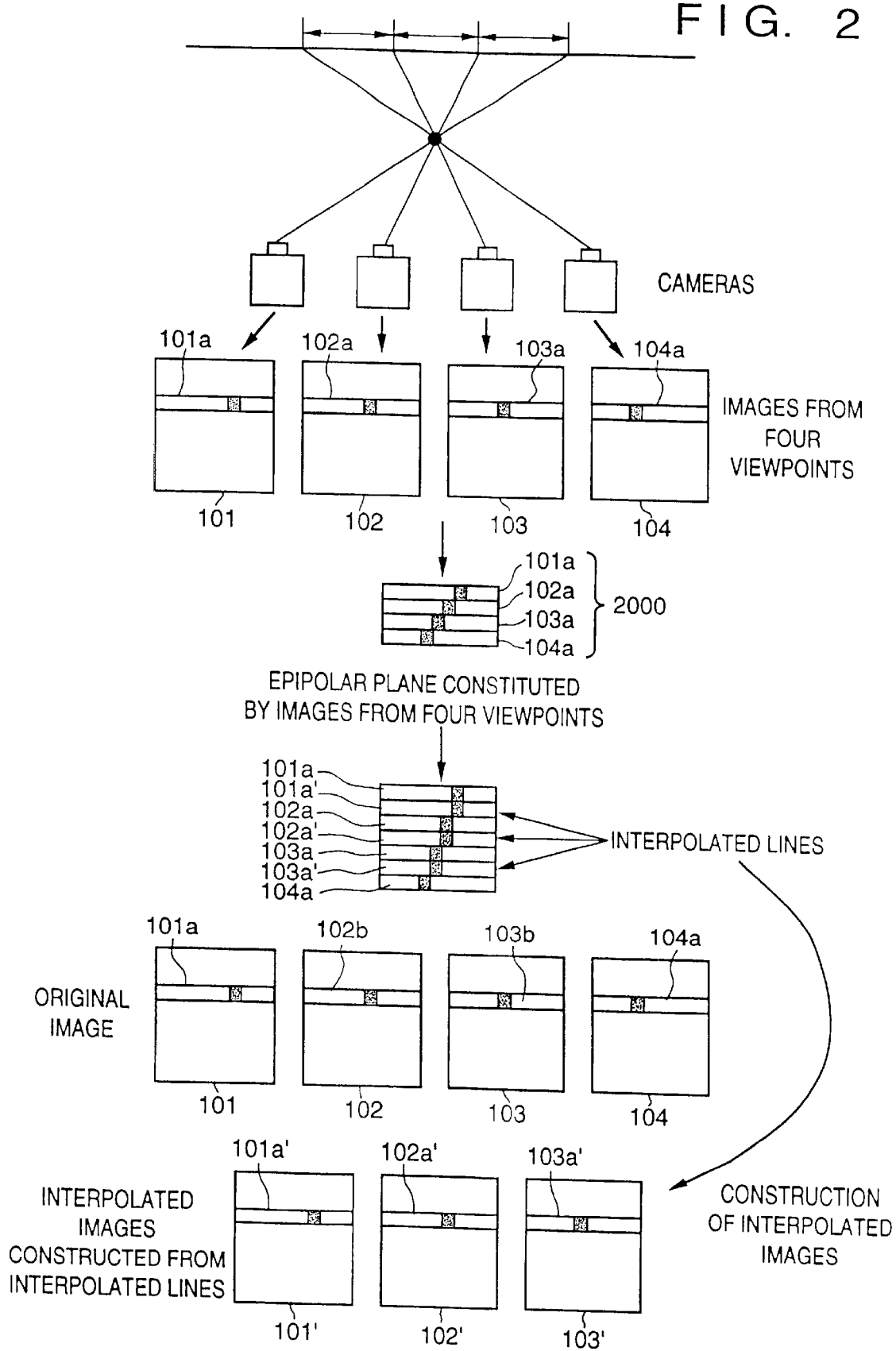
FIG. 2 is a view showing a sequence of inter-viewpoint interpolation processing.

Note that the processing in each processing unit in FIG. 2 is described by a corresponding program, stored in a ROM 27, and executed by a CPU 25. Each processing unit may independently include a CPU and a ROM to execute a corresponding program.

In this embodiment, the angles at which the above different straight lines intersect are equal to or smaller than the visual angle of a camera for photography.

In acquiring images, one set of cameras arranged on a straight line are used, and a photographing operation is performed while the set of cameras are rotated about the middle point of a line segment connecting the lens centers of the cameras on the two ends of the line, thereby acquiring images equivalent to images photographed by using a plurality of sets of cameras.

The multi-viewpoint image input unit 1001 inputs images from a multi-viewpoint image database (in a disk 29) in which images photographed from different viewpoint positions by using a plurality of sets of cameras arranged on straight lines are stored in advance.

Note that the multi-viewpoint image input unit 1001 may generate images viewed from positions other than the photographing positions by performing interpolation processing on the basis of images obtained from one or more cameras, and may input the interpolated images and the photographed images.

The image construction unit 1003 calculates parameters required for image construction from the viewpoint position of the observer and the type of the image output apparatus to be used, calculates to determine a specific pixel of an input multi-viewpoint image to which each pixel of the image constructed by using the parameters corresponds, and extracts each corresponding pixel from the multi-viewpoint image, thereby constructing an image.

The image processing method and apparatus of the present invention will be described in more detail next.

Figure 5:
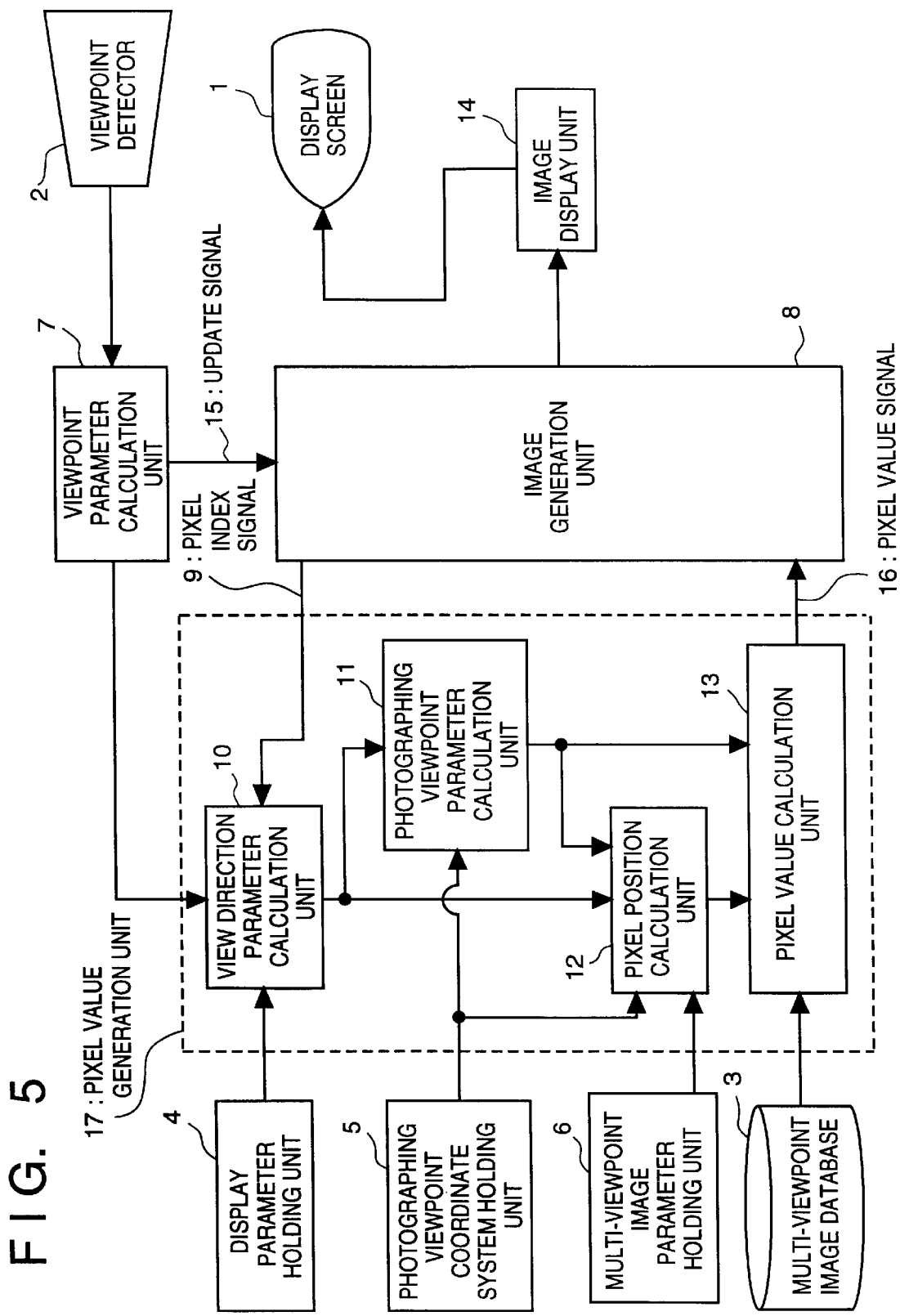
FIG. 5 is a block diagram showing the arrangement of the image processing apparatus according to the embodiment of the present invention.
Figure 6:
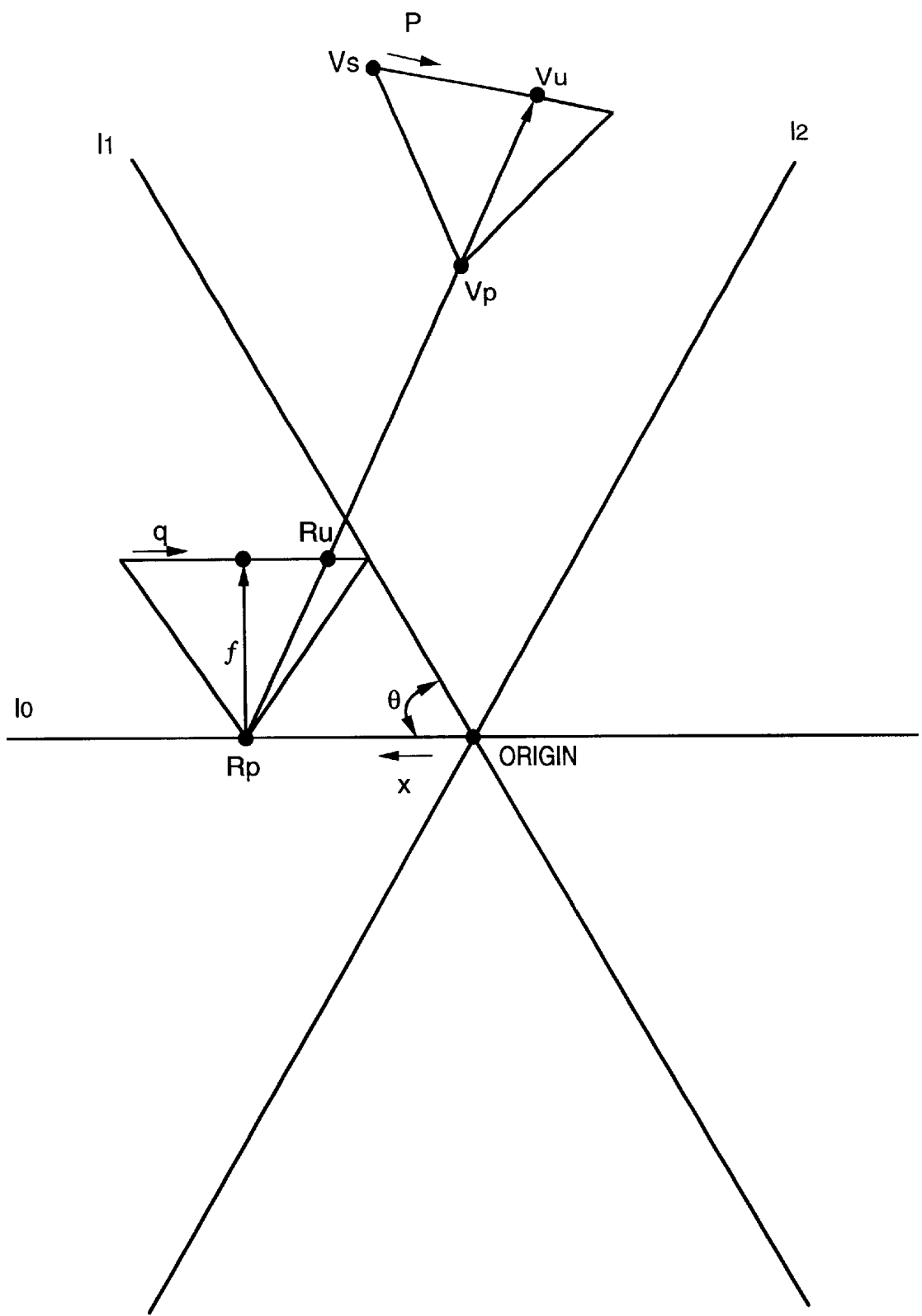
FIG. 6 is a view for explaining the principle of image processing according to the embodiment of the present invention.

FIG. 5 shows the arrangement of the first embodiment of an image display apparatus to which the image processing method of the present invention is applied. FIG. 6 is a view for explaining the image construction principle in this embodiment.

As shown in FIG. 6, in this embodiment, it is assumed that there are images which are photographed while a camera is moved at small intervals on line segments $\ell_0$, $\ell_1$, and $\ell_2$. Note that the lens center of the camera is present on these line segments, and the optical axis is perpendicular thereto. In addition, with respect to one point on a line segment, two images are photographed (photographed in opposite directions with respect to the point as a start point).

The respective line segments $\ell_0$, $\ell_1$, and $\ell_2$ have the same length, and intersect (the intersecting point is the origin) at their middle points at an angle θ (for the sake of descriptive convenience, θ=60°).

Each triangle in FIG. 6 has a vertex coinciding with the lens center and a side coinciding with the camera sensing plane. Referring to FIG. 6, reference symbol $R_p$ denotes the lens center. The side which is opposite to the lens center $R_p$ represents the sensing plane of the camera. Reference symbol $V_p$ denotes the lens center of a virtual camera. The side which is opposite to the lens center $V_p$ represents the sensing plane of the virtual camera.

Assume that an image (virtual image) corresponding to a virtual photographing point (equivalent to the viewpoint of the observer) is constructed by using images photographed on the respective line segments $\ell_0$, $\ell_1$, and $\ell_2$. As is apparent from FIG. 6, the pixel value of a virtual image $V_u$ corresponding to the lens center $V_p$ as a virtual photographing point is equal to that of an image $R_u$ photographed at the point $R_p$ as a photograph point (lens center) at which an extended line segment connecting the virtual photographing point and the virtual image $V_u$ intersects the line segments $\ell_0$, and $\ell_2$. A virtual image may be obtained by performing beam tracking in units of pixels, and determining the values of the pixels constituting the virtual image one by one in this manner.

With the above processing, an image viewed from an arbitrary viewpoint position and an arbitrary view direction can be constructed from images photographed from limited photographing viewpoint positions. However, the range in which an image viewed from an arbitrary viewpoint position and an arbitrary view direction can be constructed is limited to a hexagon formed by connecting the end points of the line segments $\ell_0$ and $\ell_1$, the line segments $\ell_1$ and $\ell_2$, and the line segments $\ell_2$ and $\ell_o$ with lines.

The arrangement of the image display apparatus according to this embodiment will be described next with reference to FIG. 5. Referring to FIG. 5, reference numeral 1 denotes a display screen, e.g., a head-mounted display (HMD), used to display images; and 2, a viewpoint detector for detecting the position of an eye of the user who sees the display screen 1.

Reference numeral 3 denotes a multi-viewpoint image database for holding multi-viewpoint images obtained by photographing an object to be displayed from viewpoints arranged at sufficiently small intervals on a plane as described above; 4, a display parameter holding unit for holding parameters associated with the display screen 1; and 5, a photographing viewpoint coordinate system holding unit for holding a coordinate system representing a viewpoint array plane which was set when the multi-viewpoint images in the multi-viewpoint image database 3 were photographed.

Reference numeral 6 denotes a multi-viewpoint image parameter holding unit for holding image parameters for the multi-viewpoint images in the multi-viewpoint image database 3; 7, a viewpoint parameter calculation unit for calculating a viewpoint parameter on the basis of a signal from the viewpoint detector 2; 8, an image generation unit for generating images corresponding to the movement of the viewpoint; and 9, a pixel index signal representing a target pixel.

Reference numeral 10 denotes a view direction parameter calculation unit for calculating a view direction corresponding to a pixel indicated by the pixel index signal 9 from viewpoint and display parameters; and 11, a photographing viewpoint parameter calculation unit for calculating an intersecting point (photographing viewpoint) between a view direction represented by a view direction parameter and a photographing viewpoint array plane represented by a photographing viewpoint coordinate system.

Reference numeral 12 denotes a pixel position calculation unit for calculating a pixel position corresponding to the view direction corresponding to an image at the viewpoint from a view direction parameter, a photographing viewpoint coordinate system, a photographing viewpoint parameter, and multi-viewpoint parameters; and 13, a pixel value calculation unit for calculating a pixel value corresponding to a multi-viewpoint image in the multi-viewpoint image database 3 on the basis of the pixel position and photographing viewpoint parameters.

Reference numeral 14 denotes an image display unit for displaying an image on the display screen 1; 15, an update signal representing that a viewpoint parameter is updated; and 16, a pixel value signal representing a pixel value. Note that the view direction parameter calculation unit 10, the photographing viewpoint parameter calculation unit 11, the pixel position calculation unit 12, and the pixel value calculation unit 13 constitute a pixel value generation unit 17.

The function of the image processing apparatus in FIG. 5 will be briefly described next. When the user who is seeing the display screen 1 changes the position of his/her head to move the viewpoint, the output signal from the viewpoint detector 2 changes. In response to this change, the viewpoint parameter calculation unit 7 sends the update signal 15 to the image generation unit 8.

Upon reception of the update signal 15, the image generation unit 8 outputs the pixel index signal 9 to the pixel value generation unit 17. With this operation, the pixel value generation unit 17 starts to generate a new image corresponding to the above movement of the viewpoint. As a result, the image generation unit 8 obtains, from the pixel value generation unit 17, the pixel value signals 16 corresponding to the pixel index signals 9 with respect to all pixels.

In the pixel value generation unit 17, first of all, the view direction parameter calculation unit 10 acquires a viewpoint parameter from the viewpoint parameter calculation unit 7, and also acquires display parameters from the display parameter holding unit 4, thereby calculating a view direction parameter corresponding to the pixel index signal 9.

The pixel value generation unit 17 then calculates a photographing viewpoint parameter representing the intersecting point (photographing viewpoint) between a view direction represented by the photographing viewpoint parameter and a photographing viewpoint array plane represented by the photographing viewpoint coordinate system.

Meanwhile, the pixel position calculation unit 12 acquires multi-viewpoint image parameters from the multi-viewpoint image parameter holding unit 6. The pixel position calculation unit 12 then calculates a pixel position corresponding to a view direction corresponding to an image at the photographing viewpoint on the basis of the view direction parameter, the photographing viewpoint coordinate system, and the photographing viewpoint parameter in addition to the acquired multi-viewpoint image parameters.

The pixel value calculation unit 13 calculates the pixel value signal 16 corresponding to a multi-viewpoint image in the multi-viewpoint image database 3 on the basis of the pixel position and the photographing viewpoint parameter, and outputs the pixel value signal 16 to the image generation unit 8.

Upon reception of the pixel value signals 16 corresponding to all pixels from the pixel value calculation unit 13, the image generation unit 8 generates an image on the basis of these pixel value signals 16 and sends the generated image to the image display unit 14.

The image display unit 14 displays the image, constructed in accordance with the new viewpoint in this manner, on the display surface of the display screen 1. As a result, the user can see the images held in the multi-viewpoint image database 3 through the display screen 1.

The processing in each unit will be described in detail below. For the sake of descriptive convenience, however, a description of the vertical disparity will be omitted.

The processing performed by the view direction parameter calculation unit 10 will be described first with reference to FIGS. 7 and 8.

Figure 7:
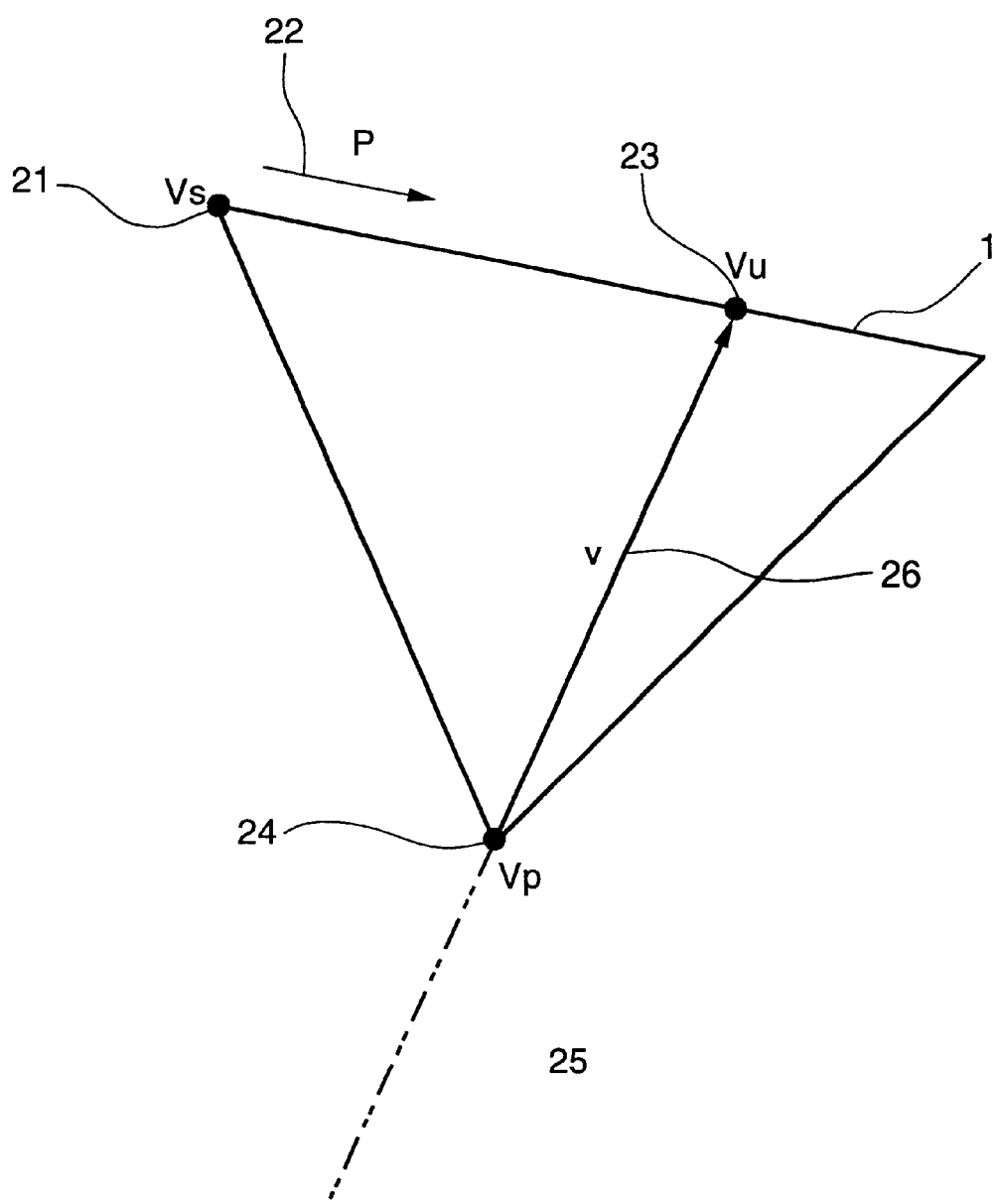
FIG. 7 is a view for explaining the principle of view direction parameter calculation.

FIG. 7 shows the calculation principle of the view direction parameter calculation unit 10. Reference numeral 1 denotes the display screen; 21, an end point (position vector Vs) of the display screen 1; and 22, a vector (display screen vector p) having a length equal to the pixel pitch of the display screen 1, and an inclination equal to the inclination of the display screen 1.

Reference numeral 23 denotes a target pixel position (position vector $V_u$) on the display screen 1; 24, the viewpoint position (position vector $V_p$) of the user; 25, a view direction corresponding to the target pixel position 23; and 26, a view direction vector (v) representing the inclination of the view direction 25.

Figure 8:
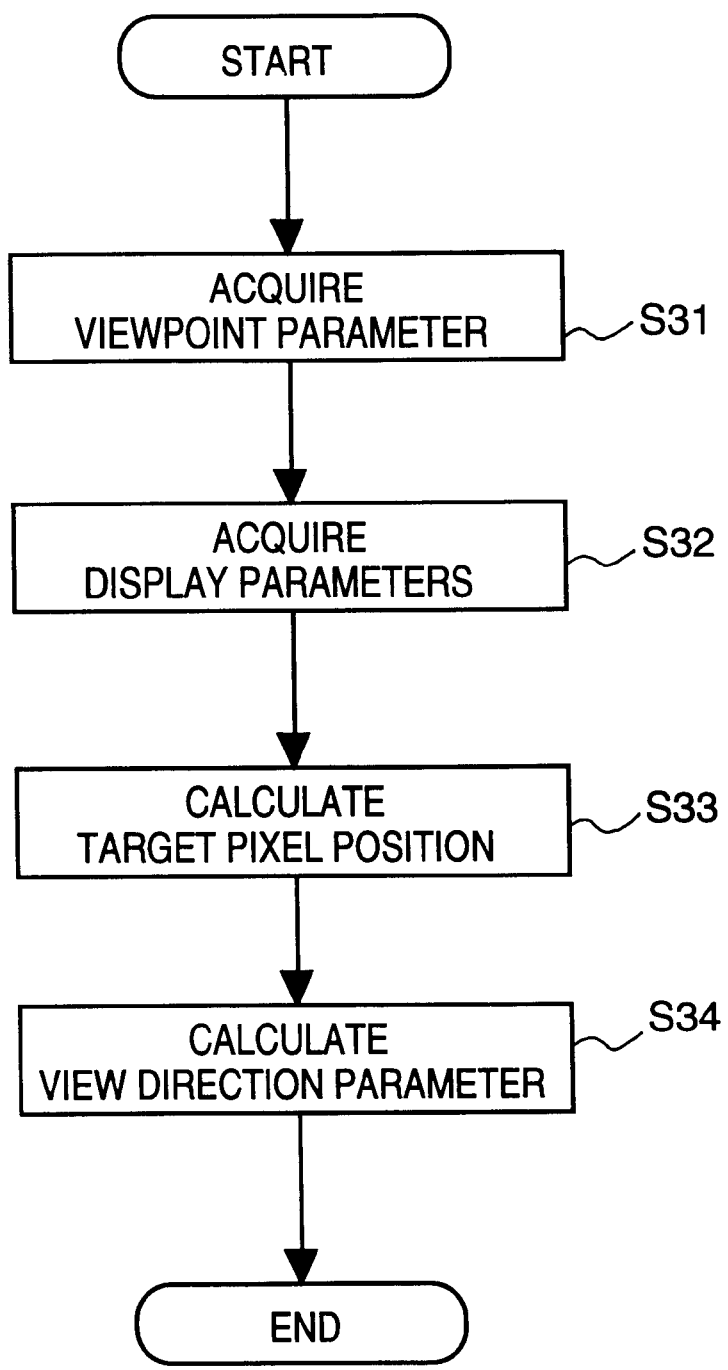
FIG. 8 is a flow chart showing a procedure for the operation of a view direction parameter calculation unit.

FIG. 8 is a flow chart showing the processing in the view direction parameter calculation unit 10. In step S31, a viewpoint parameter is acquired from the viewpoint parameter calculation unit 7. In this case, the viewpoint parameter is the viewpoint position 24 of the user in FIG. 7. In step S32, display parameters are acquired from the display parameter holding unit 4.

In this case, the display parameters are the end point 21 and the vector 22 of the display screen 1. The display screen vector 22 is determined from the inclination, actual size, and pixel size of the display screen 1.

In step S33, the target pixel position 23, on the display screen 1, which corresponds to the pixel index signal 9 is calculated in accordance with the geometric pattern in FIG. 7 according to equation (1):

$$V_u = V_s + i \cdot p \quad (1)$$

where i is the pixel index signal 9.

In step S34, a view direction parameter which corresponds to the direction of the pixel position 23 when the user sees from the viewpoint position 24 is obtained. Assume that the view direction parameter is a combination ($V_p$, v) of the viewpoint position 24 and the view direction vector 26. The view direction 25 is a straight line passing the pixel position 23 and the viewpoint position 24 in accordance with the geometric pattern in FIG. 7. The view direction vector 26 is calculated by:

$$v = V_u V_p \quad (2)$$

The processing in the photographing viewpoint parameter calculation unit 11 and the pixel position calculation unit 12 will be described next with reference to FIG. 9. First, the processing of the photographing view point parameter calculation unit 11 is described bellow.

Figure 9:
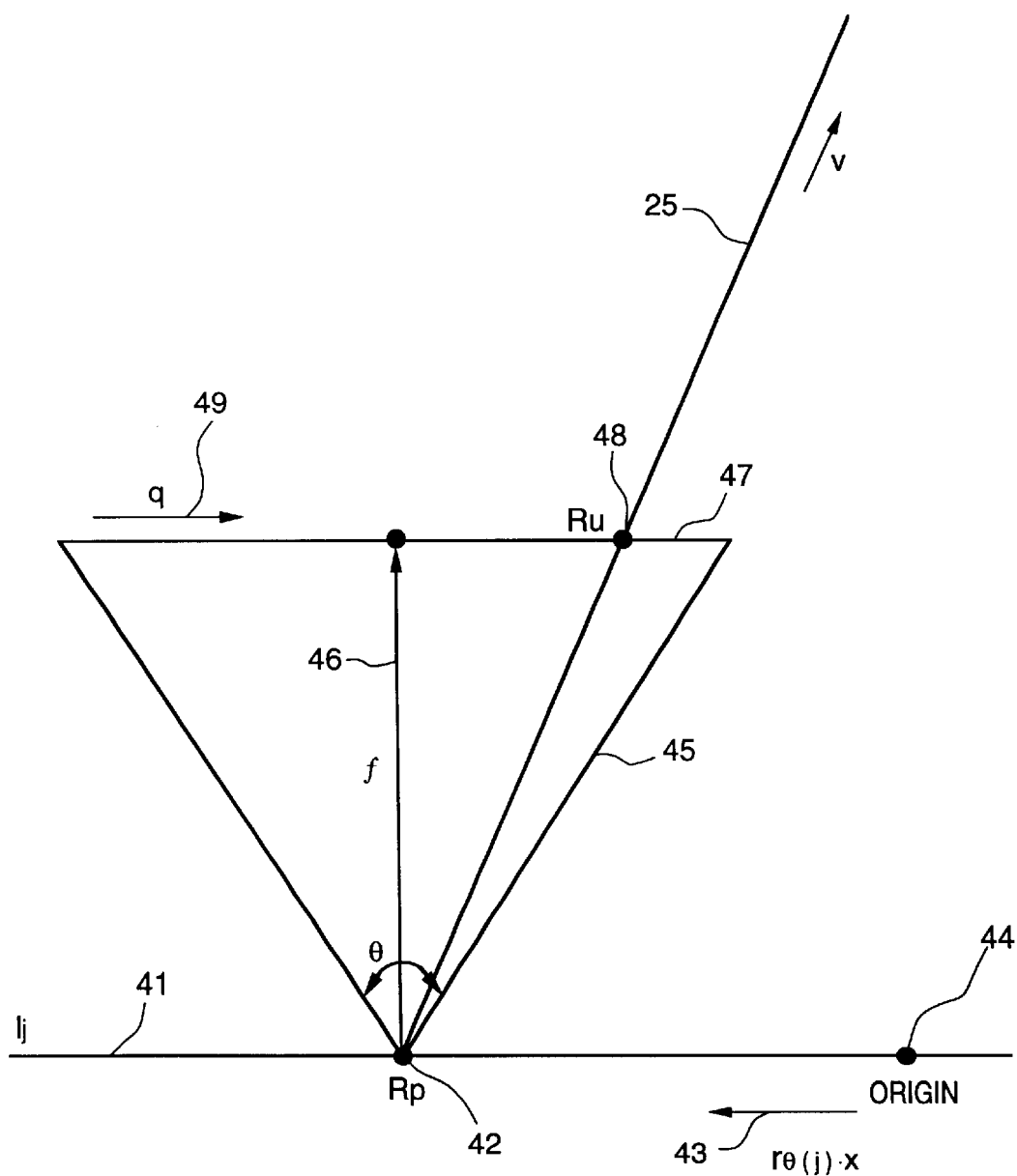
FIG. 9 is a view for explaining the calculation principles of the view direction parameter calculation unit and an pixel position calculation unit.

FIG. 9 shows the calculation principles of the photographing viewpoint parameter calculation unit 11 and the pixel position calculation unit 12.

Referring to FIG. 9, reference numeral 25 denotes a view direction; and 41, an nth photographing viewpoint array straight line $\ell_j$ (j=0, ..., n; n=[180/θ]) indicating a portion of a photographing viewpoint array set when an multi-viewpoint image in the multi-viewpoint image database 3 was photographed. In this case, [180/θ] represents an integer smaller than 180/θ. Note that the photographing viewpoint array straight lines intersect at each middle point at the angle θ.

Reference numeral 43 denotes a vector (photographing viewpoint array vector $r_θ(j) \cdot x$) representing the inclination of a photographing viewpoint array straight line 41($\ell$j). In this case, the vector x is a vector representing the inclination of the photographing viewpoint array straight line $\ell_0$.

$$r_θ(j) = \begin{pmatrix} \cos(j \cdot θ) & -\sin(j \cdot θ) \\ \sin(j \cdot θ) & \cos(j \cdot θ) \end{pmatrix}$$

Reference numeral 44 denotes an origin as the middle point of the photographing viewpoint array straight line 41($\ell$j); 45, a visual field of a view angle θ at the photographing viewpoint 42; 46, a vector (focal vector f) having a length equal to the focal length of a camera which has photographed a multi-viewpoint image, and an inclination equal to the inclination of the camera; and 47, the sensing plane of the camera at the photographing viewpoint 42.

Reference numeral 48 denotes a pixel position (position vector $R_u$) as the intersecting point between the sensing plane 47 and the view direction 25; and 49, a vector (sensing vector q) having a length equal to the pixel pitch of the sensing plane 47, and an inclination equal to the inclination of the virtual sensing plane 47 (normally, a right angle with respect to the focal vecal 46).

In this case, the photographing viewpoint array vector 43 and the origin 44 are held, as values representing a photographing viewpoint coordinate system, in the photographing viewpoint coordinate system holding unit 5. The focal vector 46 and the sensing vector 49 are held, as multi-viewpoint image parameters, in the multi-viewpoint image parameter holding unit 6.

The focal vector 46 is determined by the focal length and inclination of the camera which has photographed the multi-viewpoint image. The sensing vector 49 is a vector which crosses the focal vector 46 and has a size equal to the cell size (the size of one pixel) of the sensing plane.

The processing in the photographing viewpoint parameter calculation unit 11 will be described next with reference to FIG. 9. The photographing viewpoint 42 is expressed by the following equations (3) and (4) according to the geometric pattern in FIG. 9:

$$R_p = t \cdot r_\theta(j) \cdot x \quad (3)$$

$$R_p = V_p + a \cdot V \quad (4)$$

Wherein, t is a viewpoint parameter as a parameter uniquely representing a photographing viewpoint. In addition, j=0 to n, n=[180/θ], and a is a coefficient for the view direction.

The parameter t and Rp are calculated by solving equations (3) and (4) with respect to j=1 to n.

In this case, a plurality of combinations (j, t) can be obtained as solutions. Of these combinations, a combination with which the angle defined by a focus vector f and a view direction vector v, determined by (j, t), is the minimum angle is used as a solution.

The processing in the pixel position calculation unit 12 will be described next with reference to FIG. 9. The pixel position 48 is represented by equations (5) and (6) in accordance with the geometric pattern in FIG. 9:

$$R_U^T = R_P^T + r_\theta(j) \cdot (f^T + k \cdot q^T) \quad (5)$$

$$R_u = R_p + \beta \cdot v \quad (6)$$

where k is the pixel position parameter uniquely representing the pixel position 48, and β is the coefficient for the view direction. The parameter k is calculated by solving equations (5) and (6), and this parameter is set as an output from the pixel position calculation unit 12.

The processing in the pixel value calculation unit 13 will be described next.

First of all, an image photographed from the point nearest to the photographing viewpoint is retrieved, from the multi-viewpoint image database 3, as an approximate image of the image from the photographing viewpoint 42 represented by the photographing viewpoint parameter calculated by the photographing viewpoint parameter calculation unit 11. Subsequently, the value of the pixel, of this image, which is nearest to the pixel position 48 calculated by the pixel position calculation unit 12 is acquired, and the acquired value is output as the pixel value signal 16.

For the sake of descriptive convenience, the processing in each unit has been described without considering the vertical disparity. As is apparent, however, if multi-viewpoint images in the vertical direction are prepared, a display apparatus can be designed to allow movement of the viewpoint in an arbitrary direction by the same method as described above in consideration of the vertical disparity.

In this embodiment, the head-mounted display (HMD) is used to provide identical images for the eyes of the user. If, however, the viewpoint parameter calculation unit 7 calculates viewpoint parameters corresponding to the positions of the left and right eyes of the user, and the image generation unit 8 generates images to be provided for the left and right eyes in accordance with the viewpoint parameters, a binocular stereo display apparatus capable of moving the viewpoint in back-and-forth, vertical, and lateral directions can be realized.

Second Embodiment

The second embodiment in which the image processing apparatus according to the embodiment of the present invention is applied to an image display apparatus capable of freely moving the viewpoint even if the viewpoint intervals between multi-viewpoint images held in a multi-viewpoint image database 3 are not sufficiently small.

In this embodiment, an inter-viewpoint interpolation processing unit 1000 (see FIG. 10) is arranged between the multi-viewpoint image database 3 and the pixel value calculation unit 13 in the first embodiment. The inter-viewpoint interpolation processing unit 1000 generates multi-viewpoint images at sufficiently small viewpoint intervals from multi-viewpoint images photographed at large viewpoint intervals and held in the multi-viewpoint image database 3. The same reference numerals in FIG. 10 denote the same processing units in FIG. 5.

Similar to the first embodiment, images from arbitrary viewpoints are generated by using the multi-viewpoint images generated in this manner. For the sake of descriptive convenience, a description of the vertical disparity will be omitted. In this case, the multi-viewpoint images held in the multi-viewpoint image database 3 are multi-viewpoint images viewed from an array of photographing viewpoints arranged on a straight line in the lateral direction.

Figure 11:
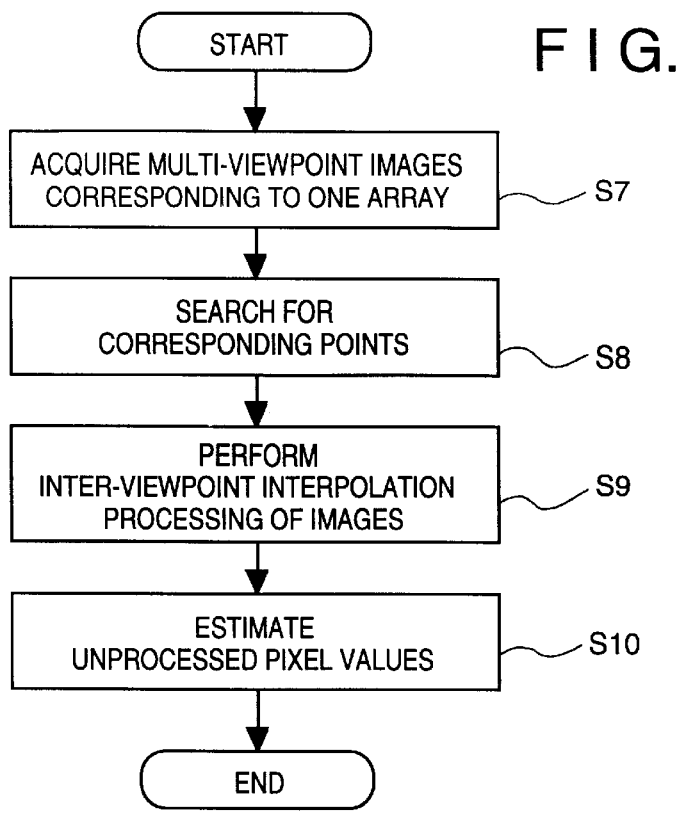
FIG. 11 is a flow chart showing a procedure for the operation of the inter-viewpoint interpolation processing unit.

The inter-viewpoint interpolation processing unit 1000 will be described in detail below with reference to FIGS. 11 to 17. FIG. 11 is a flow chart showing a sequence of processing in the inter-viewpoint interpolation processing unit 1000 of this embodiment. In step S7, multi-viewpoint images photographed at large viewpoint intervals are acquired from the multi-viewpoint image database 3.

In step S8, corresponding points between viewpoint images are searched (motion vector detection). When the search for the corresponding points is completed, the flow advances to step S9 to perform inter-viewpoint interpolation processing of images. Unprocessed pixel values are estimated in step S10 to obtain multi-viewpoint images at sufficiently small inter-viewpoint intervals.

Figure 12:
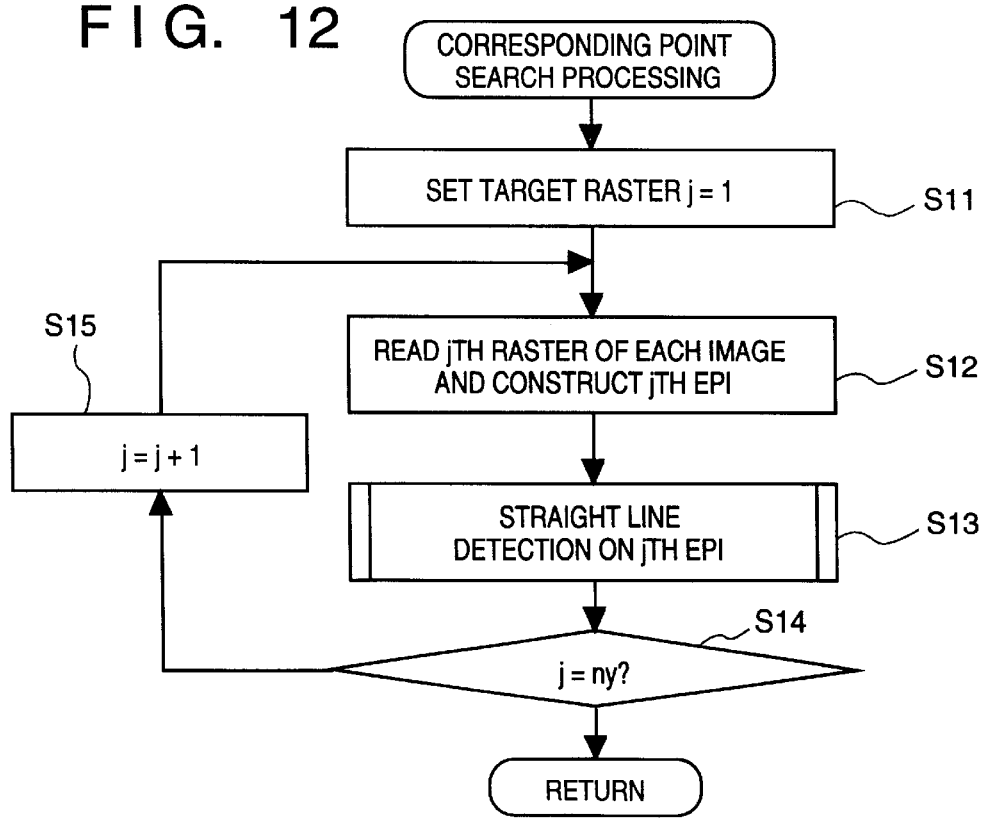
FIG. 12 is a flow chart showing a procedure for corresponding point search processing.

FIG. 12 is a flow chart showing the corresponding point search processing in step S8. In step S11, a target raster is set, as initial set data, in the first raster of each image. In step S12, the target raster of each image is stored in a work memory to virtually construct a jth epipolar plane EPI.

Figure 13:
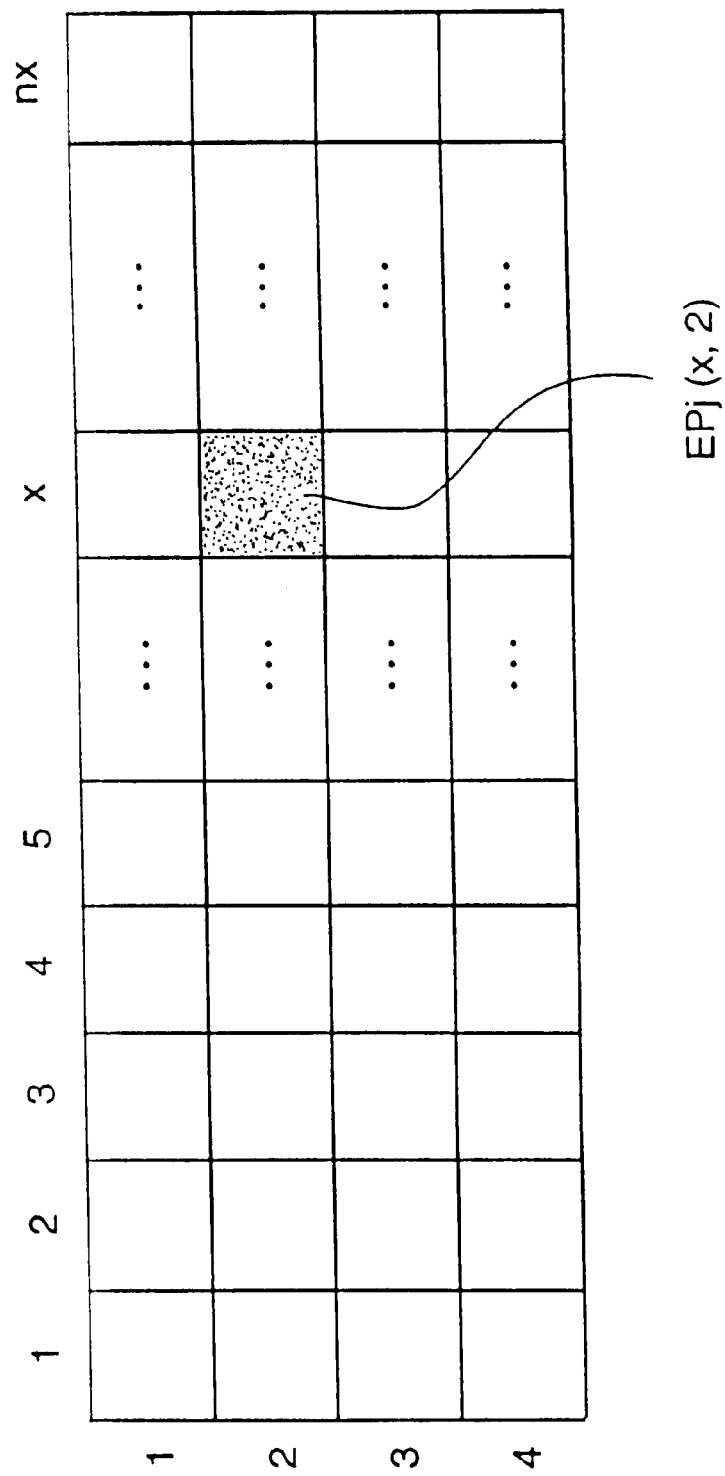
FIG. 13 is a view for explaining an epipolar plane.

In this case, as shown in FIG. 13, the jth epipolar plane EPI is a set of points EPj(x,i), on an image plane, which satisfy $$EPj(x,i) = Ni(x,j)$$

where Ni(x,j) is the xth pixel value on the jth line of the image (i=1 to 4), i.e., the value of a pixel, of the ith image, which is indicated by coordinates (x,j).

Consider a multi-viewpoint image photographed by input devices (cameras) arranged parallel at equal intervals. In this case, all corresponding points are arranged on a straight line on this epipolar plane EPI. Detection of the corresponding points, therefore, can be performed by detecting the straight line. In addition, image interpolation may be performed on the detected straight line.

Figure 14:
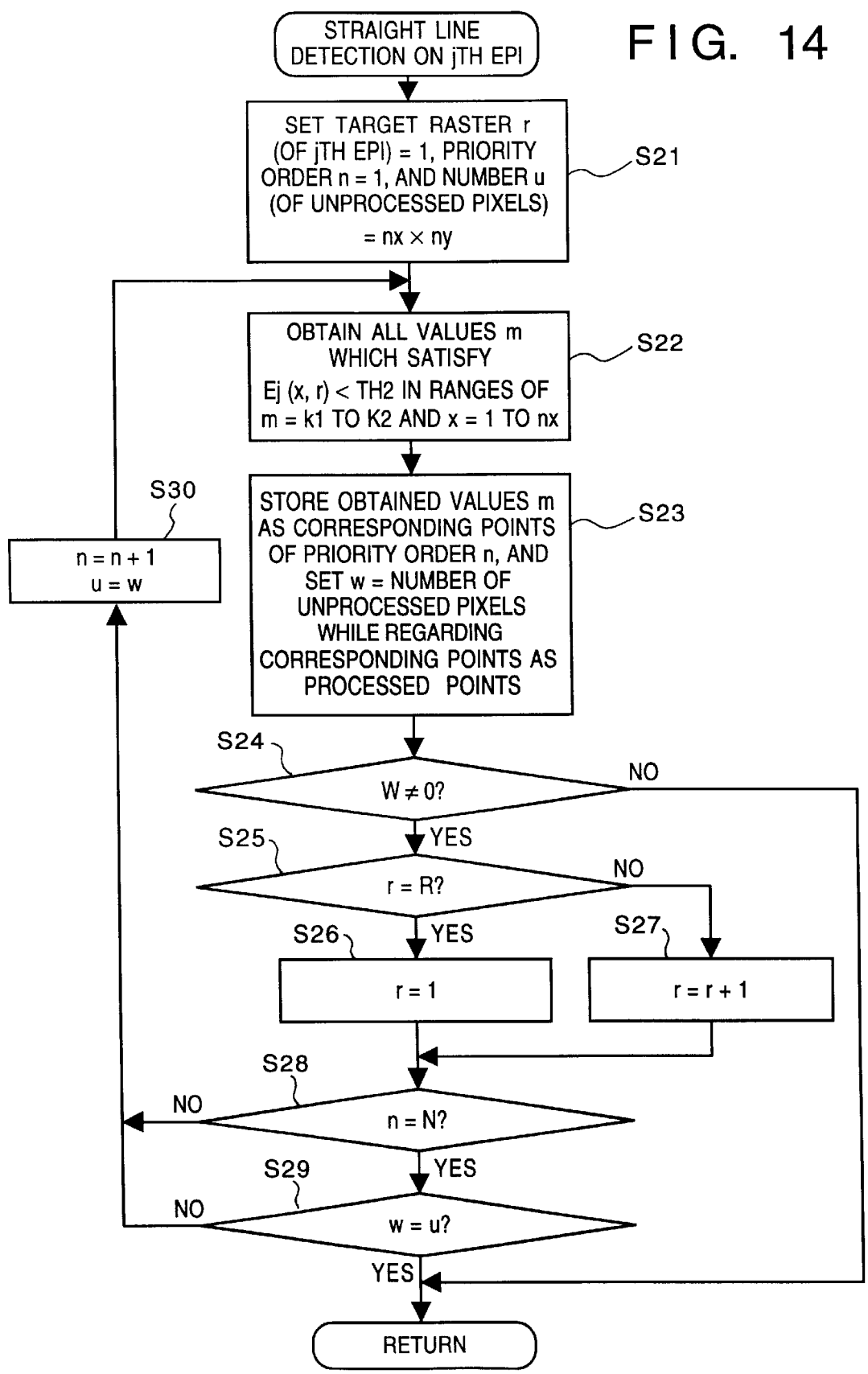
FIG. 14 is a flow chart showing a sequence of straight line detection on the epipolar plane.
Figure 16:
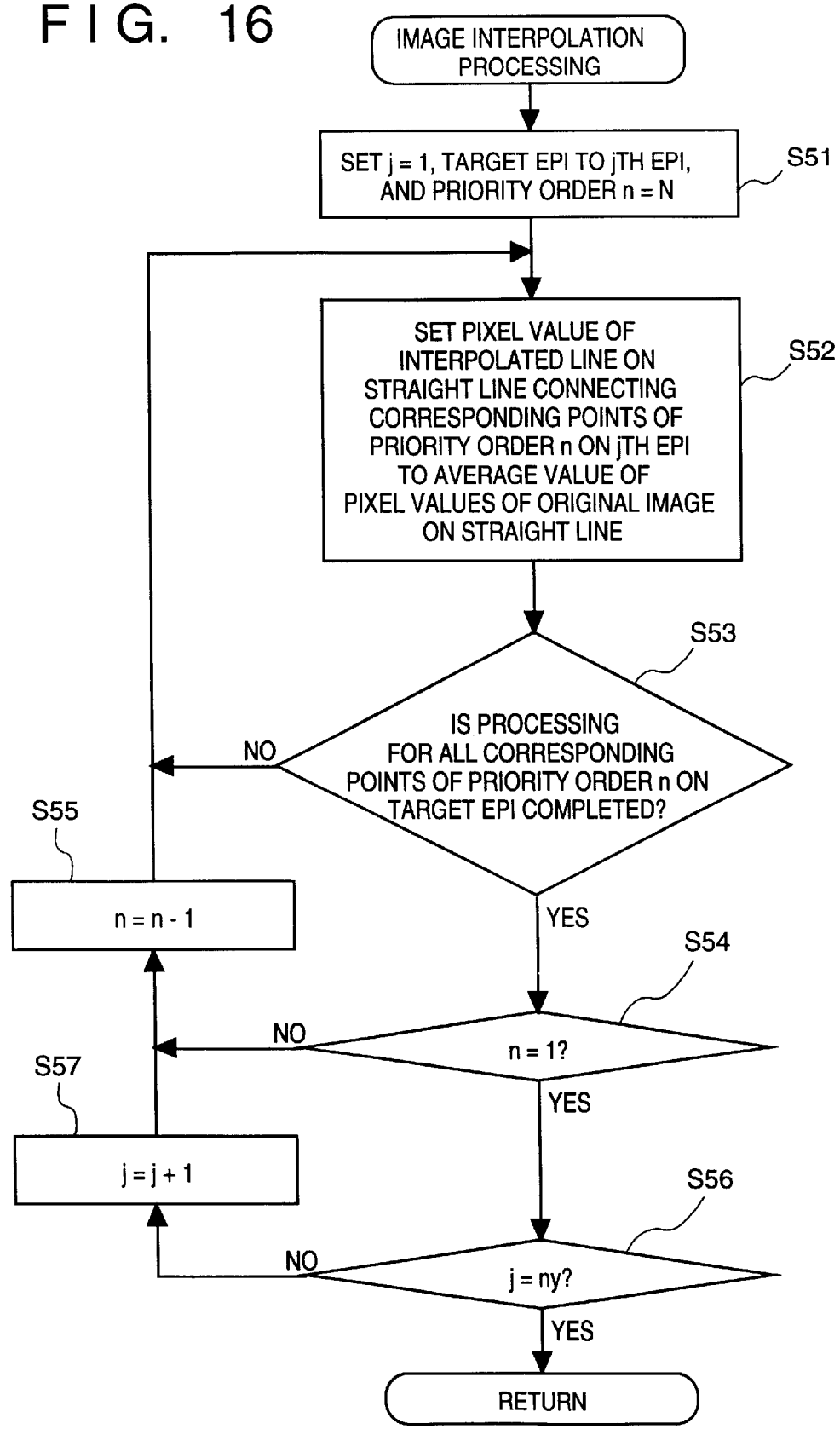
FIG. 16 is a flow chart showing a procedure for image interpolation processing.

In step S13, therefore, the straight line on which the corresponding points are present is extracted. In step S14, the corresponding points are calculated from the obtained straight line to be stored. FIG. 14 is a flow chart showing a detailed algorithm for the above processing.

In step S21, priority order n=1 and target pixel raster r=1 are set. The flow then advances to step S22 to set EPj(x,r) as a target pixel, and obtain all values m which satisfy the following equation within the ranges of m=k1 to k1+k2 and x=1 to nx:

$$E_j(X, r) = \sum_{i=1}^{n} \{EP_j(X + m \times (i-r), i) - EP_j(x, r)\}^2 < TH2$$

In this case, however, since m may take a real number value, a value expressed by x+m x (i-r) is rounded to determine the corresponding x coordinates. Note that TH2 is a threshold for detecting a corresponding point and is set to be 1200 in this case.

This threshold "1200" is based on three calculations of differences because of the four-line epipolar plane EPI. If, therefore, the respective difference values are 20 or less, 3×20×20=1200 is set on the assumption that corresponding points are almost equal in color.

If an ideal input system in which no specular component is present (points of the respective images have the same pixel value), TH2=0 may be set. In an actual input system, since points of the respective images at the same position vary in pixel value, a difference value of 20 is set in consideration of a margin.

With an increase in the precision of the input system, this difference value decreases, and vice versa. In the above method, when a pixel value is based on R, G, and B signals of the three primary colors, the above operation is performed for each signal. However, this method can cope with a case wherein a pixel value is converted into a value in various colorimetric system such as YIQ or HSI, and thresholds suitable for the respective colorimetric systems can be used.

In addition, k1 is a value determined by an input scheme. When a photographing operation is to be performed while cameras are arranged parallel at equal intervals, k1=0. A value k2 is determined by the camera interval and the distance to an object. In this case, k2=20 (it is assumed that movement does not exceed 20 pixels). Note that nx is the number of pixels of an image in the main scanning direction.

If EPj(x+m x (i-r),i) is not present, the processing is continued, assuming that no corresponding point is present with respect to m. If, however, EPj(x+mx (i-r),i) has already been processed in step S22, the processing is continued while EPj(x+mx(i-r),i)-EPj(x,r)=0.

The flow then advances to step S23 to obtain a corresponding point of the priority order n from the straight line having the inclination m which is obtained in step S22, and the corresponding point is stored in the memory. If a plurality of corresponding points are obtained, all the points are stored as the corresponding points of the priority order n for the sake of convenience. Each pixel obtained as a corresponding point is a processed pixel.

In step S23, if the corresponding point obtained from the straight line having the inclination m has already been processed, this point is excluded from the corresponding points. In addition, the number of unprocessed pixels is set to w. The flow then advances to step S24 to check whether the number of unprocessed pixels is 0.

If YES in step S24, the processing is ended, and the flow returns to step S14. If NO in step S24, the flow advances to step S25 to check whether the target raster r is the last raster. If YES in step S25, r=1 (first raster) is set in step S26. If NO in step S25, the value of the target raster is incremented by one in step S27.

Reference numeral R in FIG. 14 denotes the number of rasters constituting the epipolar plane EPI (R=4 in this case). The flow then advances to step S28 to check whether the value n representing the priority order is equal to N. N is a constant representing the complexity of the phenomenon (occlusion) in which objects conceal each other.

More specifically, as the constant N increases, more objects overlap, and vice versa. The value of the constant N is set depending on the degree of occlusion to be reproduced. In this case, as an empirical value, N=(R−1)×10, i.e., constant N=30, is set.

If n≠N in step S28, the value of n is incremented by one in step S30, and the value of w is set to u. The flow then returns to step S22. If n=N, the flow advances to step S29 to check whether the number of unprocessed pixels is smaller than that in the previous processing. If YES in step S29, the flow advances to step S30. If NO in step S29, the straight line detection processing for the jth EPI is ended, and the flow returns to step S14.

With the processing based on the above algorithm, corresponding points which cannot be obtained from two images can be detected, and occlusion and the like can be properly processed, thereby improving the corresponding point search precision.

In step S14, it is checked whether all the rasters of the input image are processed. If NO in step S14, the value of j is incremented by one in step S15, and the flow returns to step S12. If YES in step S14, the flow returns to step S9. In this case, ny represents the total number of rasters of the input image. In step S9, image interpolation processing is performed. The image interpolation processing is performed by using the corresponding points obtained in step S8.

FIG. 15 shows the jth epipolar plane EPI. Referring to FIG. 15, reference symbols a1 and b1 denote corresponding points of priority order 1; and c2, a corresponding point of prior order 2. Consider n images are interpolated between input images at equal intervals. For the sake of descriptive convenience, the number of interpolated raster is set to be two.

Figure 17:
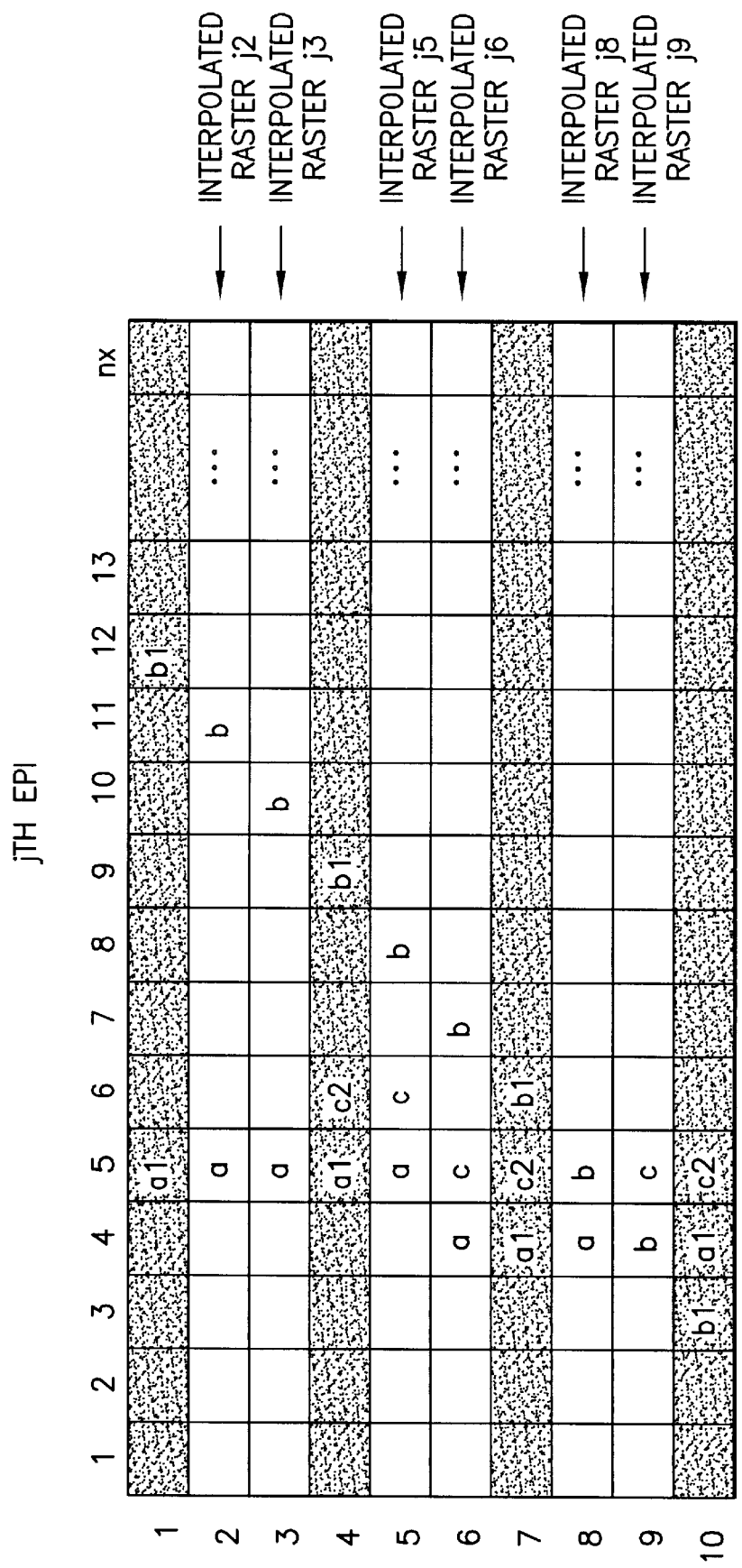
FIG. 17 is a view showing a case wherein interpolation processing is performed on the basis of detected corresponding points.

Consider the jth epipolar plane EPI. In this case, as shown in FIG. 17, two rasters may be interpolated between the respective lines of the epipolar plane EPI, and the pixel value of each interpolated raster on a straight line connecting corresponding points of the epipolar plane EPI of the original image my be set to be the average value of the corresponding points. This processing will be described below with reference to the flow chart in FIG. 16.

In step S51, initialization for image interpolation processing is performed. That is, j=1 is set, and the target epipolar plane EPI is set to the jth EPI. In addition, the priority order n is set to be n=N. In this case, the constant N is equal to N (N=30) used in step S28.

The flow then advances to step S52. In step S52, a straight line connecting the corresponding points of the priority order n on the jth EPI is considered, and the pixel value of the interpolated raster on this straight line is set to be the average value of the pixel values of the original image on the straight line. If there are a plurality of corresponding points of the same priority order are present, the corresponding points are sequentially processed in the order in which the inclination of a straight line connecting corresponding points increases (the inclination of a straight line vertical to a raster is considered to be 0).

After this processing, the flow advances to step S53 to check whether the processing in step S52 is completed with respect to all the corresponding points of the priority order n on the EPI. If NO in step S53, the flow returns to step S52. If YES in step S53, the flow advances to step S54 to check whether the priority order in the current processing is 1.

If NO in step S54, the value of the priority order is decremented by one (n=n−1) in step S55, and the flow advances to step S52. If YES in step S54, the flow advances to step S56 to check whether the target epipolar plane EPI is the last epipolar plane.

In this case, ny is equal to ny used in step S14. That is, ny is the total number of rasters of an input image. If the target raster is not the last epipolar plane EPI, the target EPI is set to (j=j+1), and the flow returns to step S55. If the target raster is the last epipolar plane EPI, the image interpolation processing is ended, and the flow returns to step S10.

As described above, corresponding points are sequentially processed in the order of increasing priority order (decreasing value of n), and a given corresponding point is overwritten by a corresponding point of a higher priority order, thereby performing interpolation processing in consideration of occlusion, as shown in FIG. 17. Reference symbols a, b, and c denote pixels which are respectively interpolated by corresponding points a1, b1, and c2.

The flow then shifts to step S10 in FIG. 11 to estimate the value of a pixel, for which no corresponding point could not be obtained in step S9, from the neighboring pixels having undergone interpolation. Methods for the above estimation include a method of using the average value of the adjacent pixels as an estimated value, and a method of using the nearest pixel position as an estimated value.

An inter-viewpoint interpolated image is generated from images in the multi-viewpoint image database 3 by using the above arrangement and method. With this processing, an image from a viewpoint other than a photographing viewpoint can be obtained on a photograph viewpoint array straight line so that an image from an arbitrary viewpoint can be generated. For this reason, multi-viewpoint images obtained at sufficiently small viewpoint intervals need not be held in the multi-viewpoint image database 3, and hence the storage capacity of the multi-viewpoint image database 3 can be greatly reduced.

The above description is made without considering the vertical disparity. However, an image can also be generated in consideration of the vertical disparity in the following manner. Multi-viewpoint images photographed from photographing viewpoints arranged at large intervals on a plane in the form of a lattice are held in the multi-viewpoint image database 3. These multi-viewpoint images are subjected first to inter-viewpoint interpolation in the lateral direction. Inter-viewpoint interpolation is then performed in the vertical direction.

Third Embodiment

The third embodiment of the present invention will be described next. In the first embodiment described above, the view angle of the camera is equal to the angle at which the line segments $\ell_0$, $\ell_1$, and $\ell_2$ intersect. In general, if the angle at which the line segments $\ell_0$, $\ell_1$, and $\ell_2$ intersect is smaller than the view angle of the camera, the viewpoint can be freely moved within the range defined by the line segments $\ell_0$, $\ell_1$, and $\ell_2$.

In each embodiment described above, multi-viewpoint images photographed in advance are held in the multi-viewpoint image database 3. If this arrangement is replaced with a multi-eye camera capable of acquiring multi-viewpoint images in real time (a plurality of sets of cameras arranged on straight lines are used), a real-time arbitrary viewpoint image photographing/display system can be realized.

Although a real-time photographing operation cannot be performed, a plurality of cameras are arranged on the line segment $\ell_0$ to photograph images, and a photographing operation is performed after all the cameras are rotated to the position of the line segment $\ell_1$. Similarly, a photographing operation is performed after the cameras are rotated to the position of the line segment $\ell_2$. With this operation, a photographing operation can be performed at a high speed with a small number of cameras.

In this case, if the center of rotation is set at the middle point of a line segment connecting the lens centers of the cameras on the two ends of the straight line on which the cameras are arranged, the area in which the viewpoint can be freely moved is maximized.

The present invention may be applied to a single image processing apparatus or system equipment such as a multi-viewpoint television system, a multi-viewpoint television telephone terminal system, or a multi-viewpoint television conference system. In addition, the present invention can be applied to a composite apparatus constituted by a combination of a computer and an image processing apparatus.

As described above, according to the present invention, images obtained from a plurality of viewpoint positions arranged on a plurality of different straight lines are input, and the position of an eye of the observer who is seeing the image, and the direction in which the observes is seeing are detected. On the basis of the detection result, an image viewed from the detected viewpoint position is constructed from the multi-viewpoint image data. Therefore, images corresponding to arbitrary movement of the viewpoint in a space can be constructed, and the viewpoint can be arbitrarily moved in the space.

According to another characteristic feature of the present invention, since many inter-viewpoint interpolated images are generated from images in the corresponding point image database by interpolation processing, multi-viewpoint images obtained at sufficiently small viewpoint intervals need not be held in the multi-viewpoint image database to allow arbitrary movement of the viewpoint in a space, as described above. For this reason, the storage capacity of the multi-viewpoint image data need not be large, and hence the apparatus can be realized without increasing the size and the cost.

Fourth Embodiment

Figure 18:
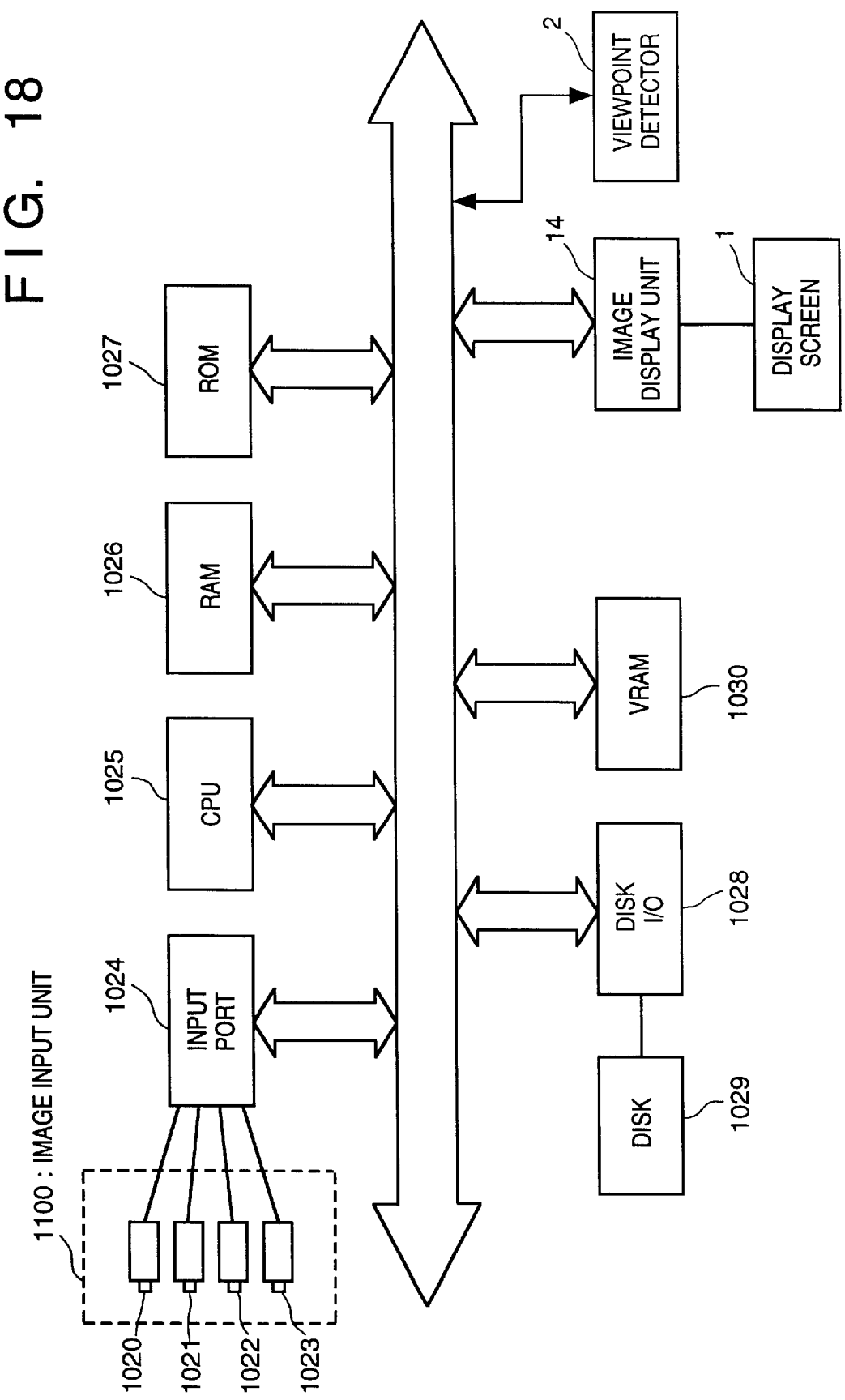
FIG. 18 is a block diagram showing the hardware arrangement of an image processing apparatus according to still another embodiment of the present invention.

The fourth embodiment of the present invention exemplifies the hardware arrangement (see FIG. 18) in which four cameras are used as the image input units for executing the image processing in each embodiment described above.

Reference numerals 1020 to 1023 denote image input units such as cameras; 1024, an input port; 1025, a CPU; 1026, a RAM; 1027, a ROM; 1028, a disk I/O port; 1029, a hard disk; 1030, a VRAM; 1031, a video signal output I/F; and 1032, a lenticular display. In this embodiment, the four cameras are used. However, the number of cameras is not limited to four but may be any number.

Figure 10:
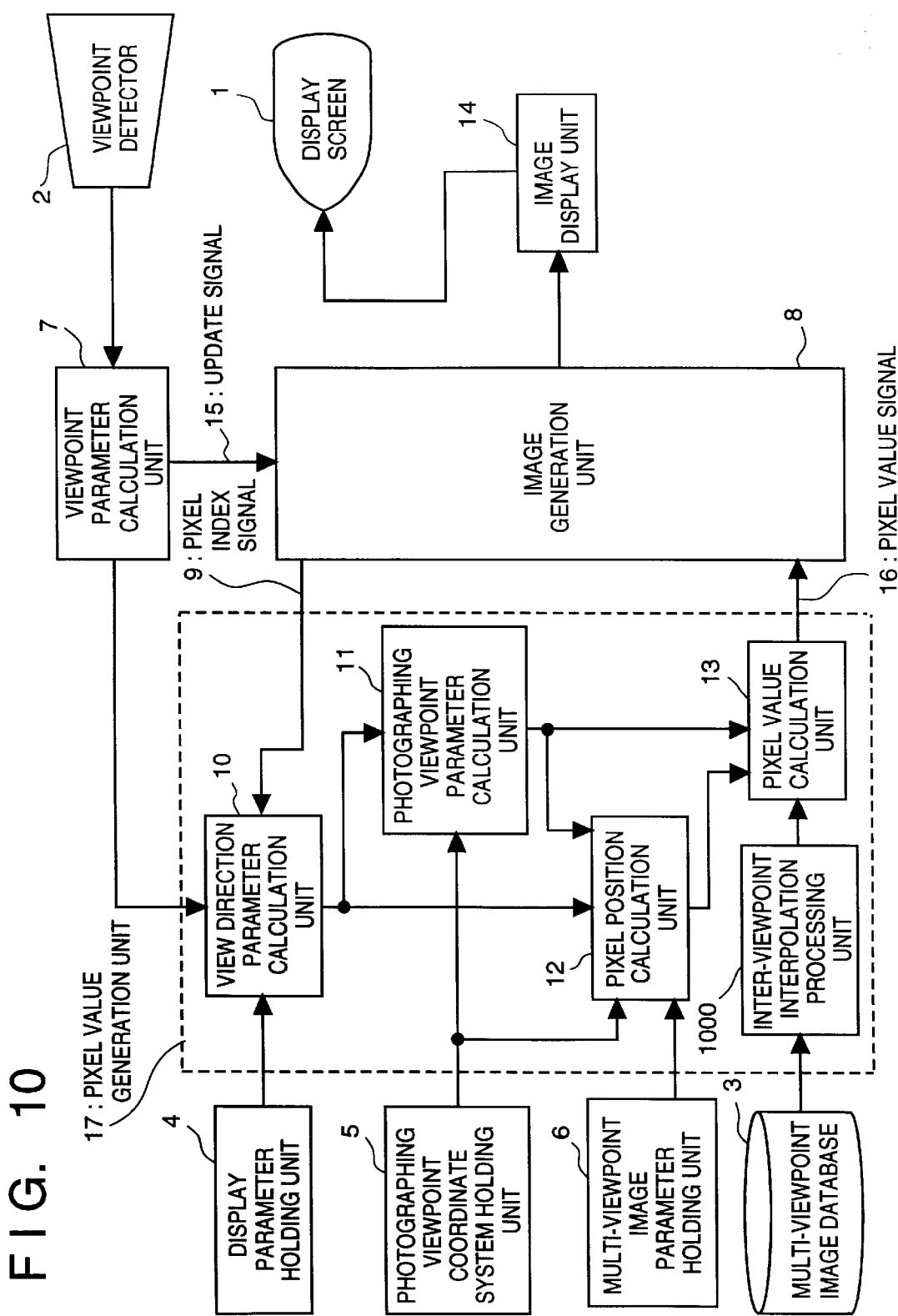
FIG. 10 is a block diagram showing an image processing apparatus incorporating inter-viewpoint interpolation processing unit according to another embodiment of the present invention.

Image processing programs corresponding to the flow charts in FIGS. 3, 8, 11, 12, 14, and 16 are stored in the ROM 1027 together with the programs in which the processing in each processing unit in FIGS. 4, 5, and 10 is described. The CPU reads out, interprets, and executes these programs. The multi-viewpoint image database 3 (FIGS. 5 and 10) is stored in the hard disk 1029. This database is multi-viewpoint image data input from an image input unit 1100. A display parameter holding unit 4, a photographing viewpoint coordinate system holding unit 5, and a multi-viewpoint image parameter holding unit 6 are assigned to the RAM 1026.

The procedures for the processing in a viewpoint parameter calculation unit 7, a view direction parameter calculation unit 10, a photographing viewpoint parameter calculation unit 11, a pixel position calculation unit 12, an pixel value calculation unit 13, and an image generation unit 8, and the inter-viewpoint interpolation processing unit 1000 are described in corresponding processing programs, and are stored in the ROM 1027.

Note that these programs may be stored in the hard disk 1029, and may be loaded into the RAM 1026, as needed, to be executed.

Fifth Embodiment

Unlike the correction method of each embodiment described above, a method according to the fifth embodiment of the present invention allows proper correction processing even if a photographed image includes distortion, offset, or noise. This method will be mainly described below.

Figure 19:
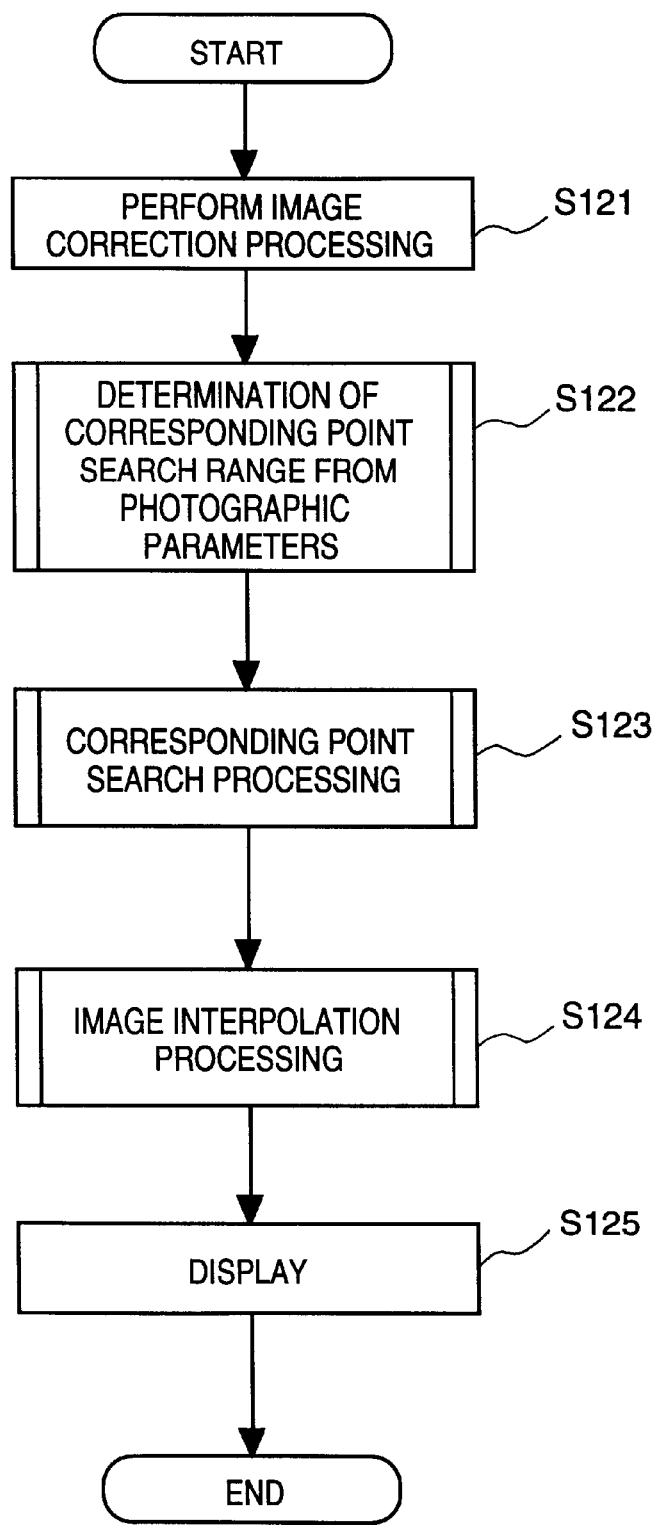
FIG. 19 is a flow chart showing a procedure for image processing including image interpolation processing as a characteristic feature of the present invention.

FIG. 19 is a flow chart showing a sequence of processing in the fifth embodiment. In step S121, original images input from image input units 1020 to 1023 such as cameras are subjected to geometric correction processing for, e.g., the chromatic aberration and distortion of each lens, an offset from each optical axis, and the posture/position of each camera, and correction processing for the sensitivity irregularity of a CCD sensor and the like. If correction data are calibrated and stored in a ROM 1027 and a RAM 1026 in advance, such correction processing can be performed at a high speed by referring to tables in these memories. In addition, if these correction data are obtained before each image input operation is performed, accurate correction can be realized.

This correction processing is completed, the flow advances to step S122 to determine a corresponding point search range (to be described later) from photographic parameters. The flow then advances to step S123 to search for corresponding points between the respective images by using the determination result. When the corresponding point search processing is completed, the flow advances to step S124 to perform image interpolation processing. Thereafter, in step S125, the input images having undergone correction and the interpolated images are displayed on a lenticular display 1.

Note that image correction processing realized by the steps in the flow chart in FIG. 19 except for step S125 can be replaced with the processing in the inter-viewpoint interpolation processing unit 1000 in FIG. 10.

The processing in each step will be described in detail next.

The corresponding point search range calculation processing (step S122) will be described first with reference to FIG. 20.

Figure 20:
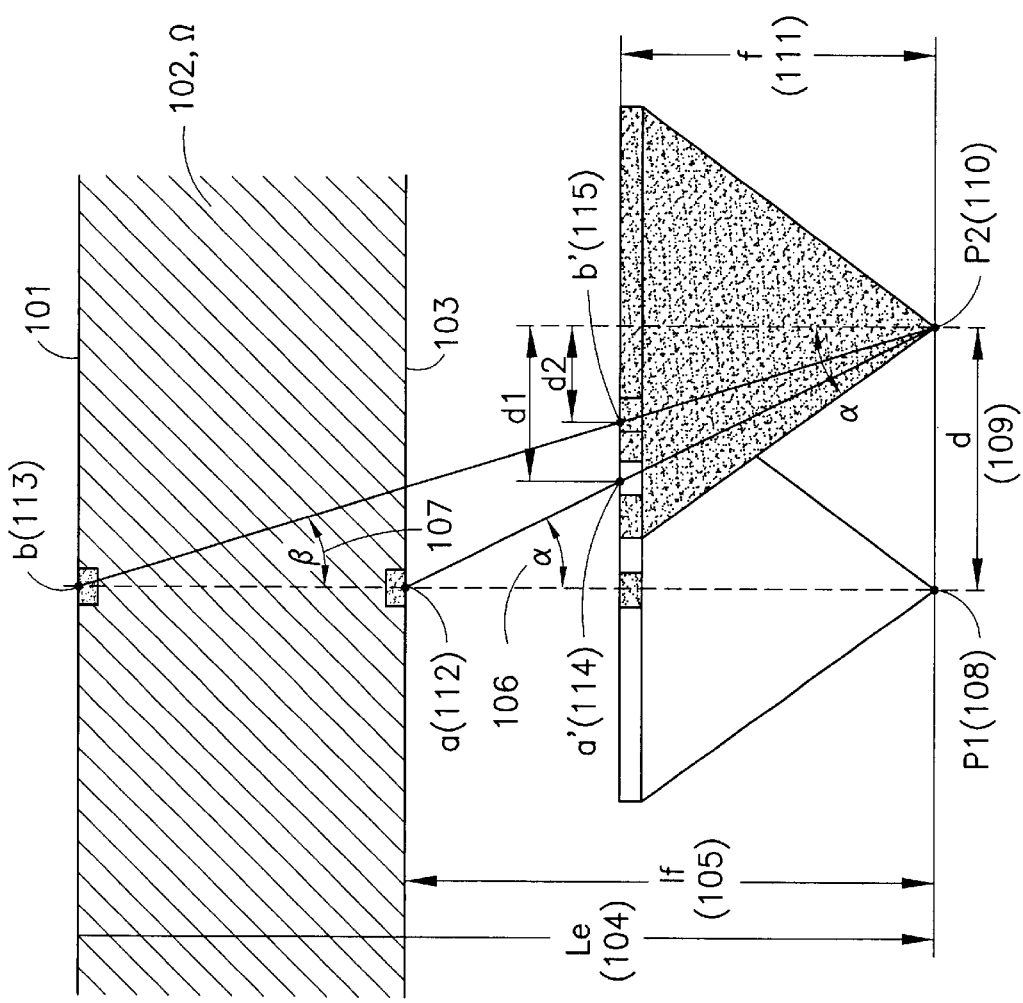
FIG. 20 is a view showing the calculation principle of a corresponding point search range from photographic parameters in step S122.

FIG. 20 shows the calculation principle for a corresponding point search range. Referring to FIG. 20, reference numeral 101 denotes a plane at the rear end of a space to be photographed; 102, a photographic space Ω; 103, a plane at the front end of the space to be photographed; 104, a distance to the plane at the rear end of the space to be photographed; 105, a distance (Lf) to the plane at the front end of the space to be photographed; 106, an angle α defined by a vertical line extending from a photographing position P1 (108) to a sensing plane and a straight line extending from a photographing position P2 (110), separated from the photographing position P1 by a distance d (109), to an object a (112) on the plane at the front end of the photographic space Ω; 107, an angle β defined by a straight line extending to an object b (113) on the plane 101 at the rear end of the photographic space Ω and a vertical line extending from the viewpoint position P1; and 111, a focal length f. Reference symbols a' (114) and b' (115) respectively denote the positions of the object a (112) and the object b (113) on the sensing plane. The distance between the positions a' and b' in an image plane as a corresponding point search range is obtained in accordance with the geometric pattern in FIG. 3.

A distance d1 (the distance between a position, on the sensing plane, which corresponds to an object point and a position where the sensing plane and the optical axis intersect) to the object a (112) at the front end of the photographic space Ω on the sensing plane at each of the photographing positions P1 (108) and P2 (110) is obtained. The distance d1 can be obtained by the following equation according to FIG. 3:

$$d1 = f/\tan\alpha = f/(d/Lf) \tag{11}$$

Similarly, a distance to the object (113) at the rear end of the photographic space Ω at each of the viewpoint positions P1 (108) and P2 (110) is obtained:

$$d2 = f/\tan\beta = f/(d/Le) \tag{12}$$

As described above, the corresponding point search range may be changed within the interval between d1 to d2 which corresponds to the inclination range of straight line search as corresponding point search.

A search pitch s in the interval between d1 and d2 can be set from the number (N) of cameras according to the following equation:

$$s = 1/N \tag{13}$$

Corresponding point search processing (step S123) based on the obtained corresponding point search parameters will be described next with reference to FIG. 21.

Figure 21:
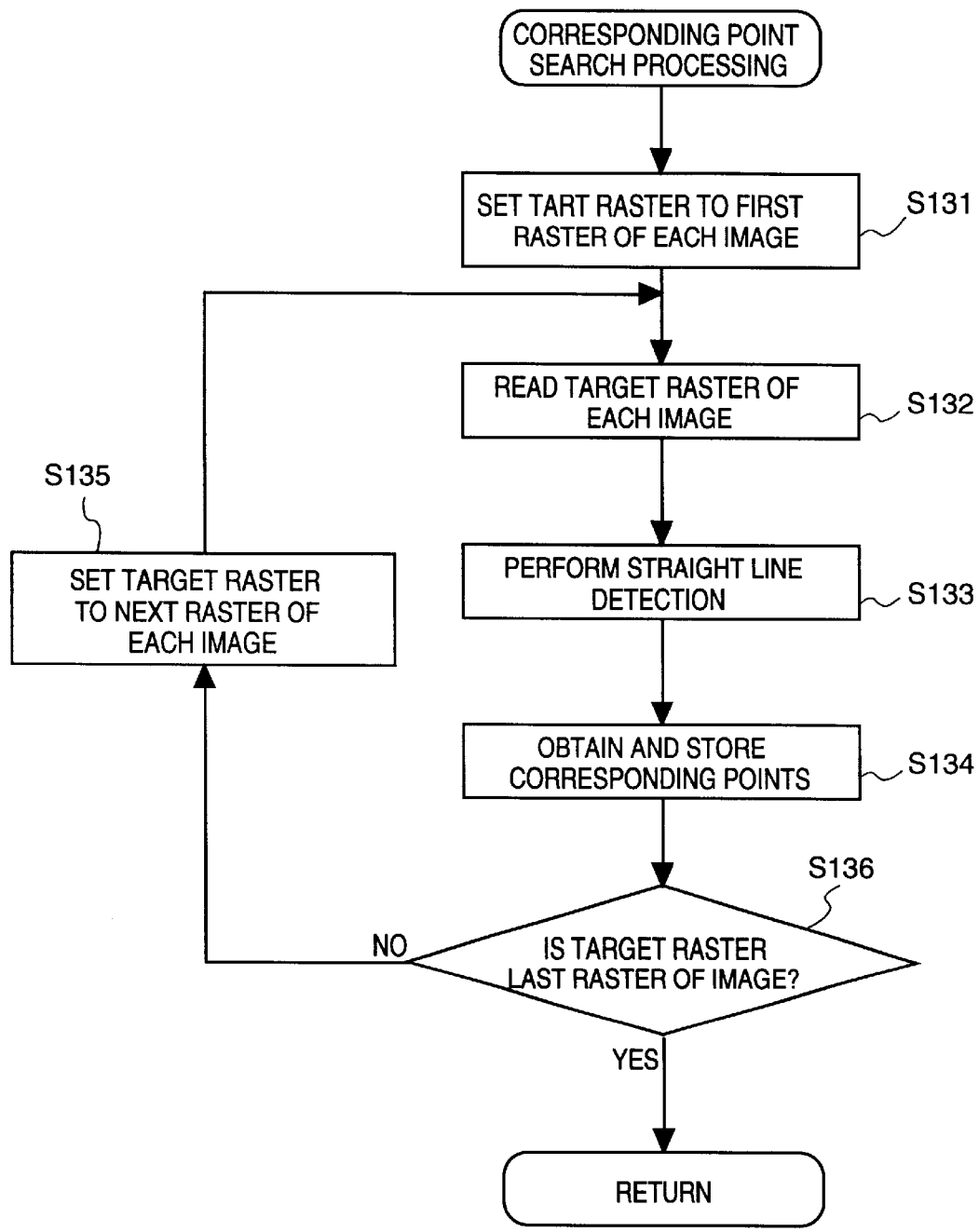
FIG. 21 is a flow chart showing a sequence of corresponding point search processing in step S123.
Figure 22:
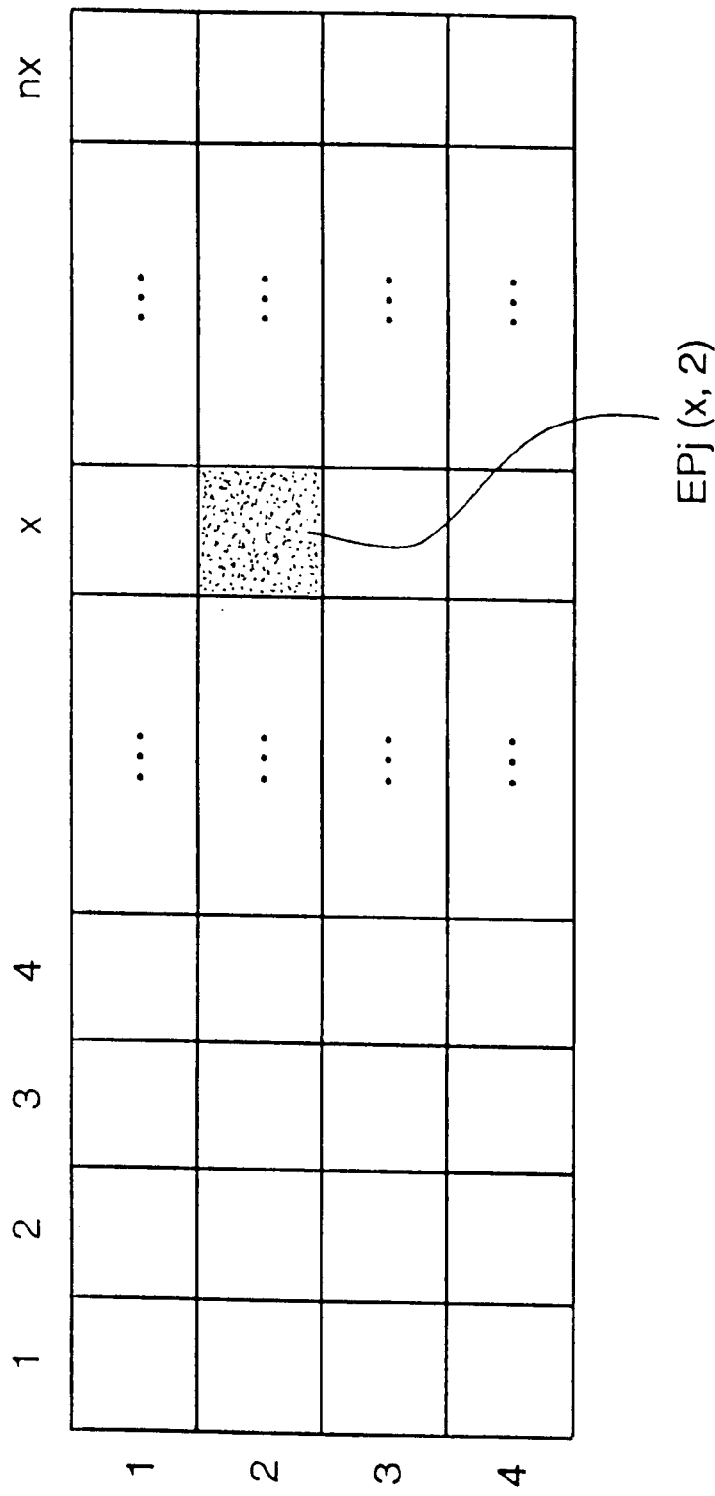
FIG. 22 is a view of a format showing the jth epipolar plane image.

FIG. 21 is a flow chart showing the corresponding point search processing in step S23 described above. In step S31, initialization is performed to set a target raster to the first raster of each image. In step S32, the target raster of each image (each raster is parallel to an epipolar plane) is stored in a work memory to virtually form the jth epipolar plane image (EPI). In this case, as shown in FIG. 22, the jth EPI is a set of points EPj(x,i), on an image plane, which satisfy $$EPj(x,i) = Ni(x,j) \tag{14}$$

where Ni(x,j) is the xth pixel value on the jth raster of the ith image (i=1 to 4), i.e., the value of a pixel, of the ith image, which is indicated by coordinates (x,j).

If image input units such as cameras are arranged parallel at equal intervals, all corresponding points are arranged on a straight line on this EPI. For this reason, corresponding points can be detected by detecting a straight line on the EPI in step S133. In addition, image interpolation may be performed on the detected straight line. In step S134, therefore, corresponding points are calculated from the obtained straight line and stored. Since the detected straight line directly affects the image quality, more accurate corresponding points are preferentially detected in the corresponding point search processing in step S123. In this case, a straight line having a width is defined as an array of straight lines having the same inclination, and detection of a straight line having a width indicates detection of a parallelogram area in which each straight line satisfies a straight line determination condition. If, for example, four parallel straight lines constitute a straight line having a width of 4. As the width of a straight line increases, the possibility of accurate corresponding points becomes higher. Such a straight line therefore is preferentially detected as corresponding points. For example, a priority is given to a correspondence relationship detected by straight line detection of a straight line having a width of 4 over that detected by straight line detection of a straight line having a width of 2.

Figure 23:
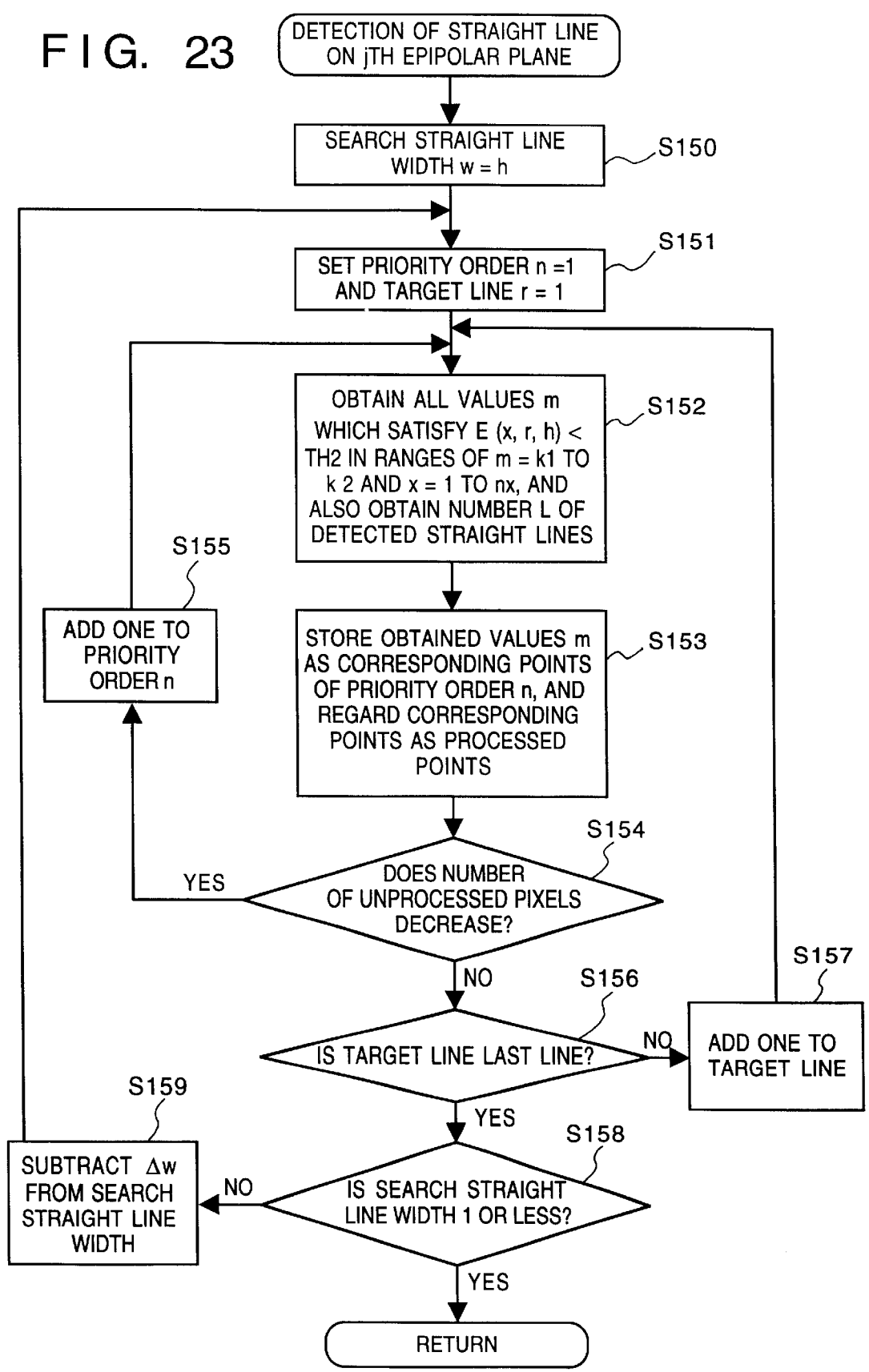
FIG. 23 is a flow chart showing a sequence of straight line detection in step S124.

The algorithm will be described in detail below with reference to the flow chart in FIG. 23.

In step S150, search straight line width W=h is set. If the initial value of the search straight line width is excessively large, the processing cannot be completed within a reasonable calculation time. For this reason, for example, h=8 is set. In step S151, priority order n=1 and target pixel line r=1 are set. In step S152, assume that EPj(x,r) is set as a target pixel, that the value range of m as the distance from the target pixel which corresponds to the inclination of each straight line is set as m=d1 to d2, and that the value range of x of the target pixel is set as x=1 to nx where nx is the size on the sensing plane in the main scanning direction. In this case, all values m which correspond to the inclinations of straight lines and satisfy the following equation are obtained, and the number of detected straight lines is stored as L:

$$Ej(x, r, h, m) = \sum_{i=1}^{4} \sum_{w=0}^{h} \{EP_j(X + W + m \times (i-r), i) - EP_j(X + W, r)\}^2 \underset{i \neq r}{<} TH2 \quad (15)$$

Since m is changed at the search pitch s set in step S122, it may take a real number value. Although equation (5) represents a case wherein straight lines are obtained from the value range of i from 1 to 4, i.e., four images, it is apparent that straight lines may be obtained from five or more images, i.e., the value range exceeding the range of i from 1 to 4.

In the above equation, the value of x+w+m x (i−r) is rounded to determine a corresponding x-coordinate. TH2 is a threshold for corresponding points. This threshold TH2 may be 1200×W. This threshold "1200×W" is based on three calculations of differences because of the four-line epipolar plane EPI. If, therefore, the respective difference values are 20 or less, $3 \times 20^2 = 1200$ is set on the assumption that corresponding points are almost equal in color, and the resultant value is multiplied by the width W of the parallelogram. That is, 1200×W is set. In the above method, when a pixel value is based on R, G, and B signals of the three primary colors, the above operation is performed for each signal. However, this method can cope with a case wherein a pixel value is converted into a value in various calorimetric system such as YIQ or HSI, and thresholds suitable for the respective calorimetric systems can be used.

If EPj(x+w+mx(i−r),i) is not present, it is checked whether the straight line determination condition is satisfied between the target point EPj(x,r) and EPj(x+mx(i−2),r−1). If the condition is satisfied, a parallelogram area is detected. If the condition is not satisfied, it is determined that no corresponding points with this inclination m are present, and the processing is continued.

In step S153, corresponding points of the priority order n are obtained from the straight lines having the inclination m which are obtained in steps S151 and S152, and the search straight line width h and the colors of the straight lines (an array of h types of colors when detection is performed with the width h) are stored in the memory.

The processing in steps S152 and S153 is regarded as one cycle. This cycle is repeated until it is determined in step S154 that the number of unprocessed pixels does not decrease. In this case, the value of the priority order n is incremented by one in step S155. If, however, EPj(x+mx(i−r),i) has already been processed in step S155, the processing is continued while EPj(x+mx(i−r),i)−EPj(x,r)=0.

If the number of unprocessed pixels does not decreased even after the processing in steps S152 to S154, the flow advances to step S157 to add one to the target line, and the same processing as that in steps S152 to S155 is performed with EPj(x,r+1) being set as a target pixel. Note that x=1 to nx.

If it is determined in step S156 that the last line is processed, the search straight line width is decreased by ΔW in step S159. Thereafter, the processing in steps S151 to S157 is performed.

If it is determined in step S158 that the search straight line width is smaller than one, the corresponding point search processing is ended.

Subsequently, in step S135 in FIG. 21, one is added to the value of a raster j, and then the processing of steps S32 to S34 is performed in the same manner as described above. If it is determined in step S136 that the last raster is processed, the corresponding point search processing is ended.

With the above processing, corresponding points which cannot be obtained from two images can be detected, and occlusion and the like can be properly processed. For this reason, the corresponding point search precision can be improved. In addition, the frequency of detection of erroneous corresponding points can be decreased by preferentially detecting straight lines having larger widths. In the conventional method of detecting a straight line having a width of 1, in a monochrome parallelogram, several straight lines are detected per target point, resulting in an excessive calculation time. In the method of this embodiment, detection can be performed by search processing with respect to one target point. Therefore, the calculation time can be shortened, and the memory area for storing straight line data can be reduced.

The flow advances to step S124 in FIG. 19 to perform image interpolation processing. The image interpolation processing is performed by using the corresponding points obtained in step S123. An algorithm for this processing will be described in detail below with reference to FIG. 24.

Figure 24:
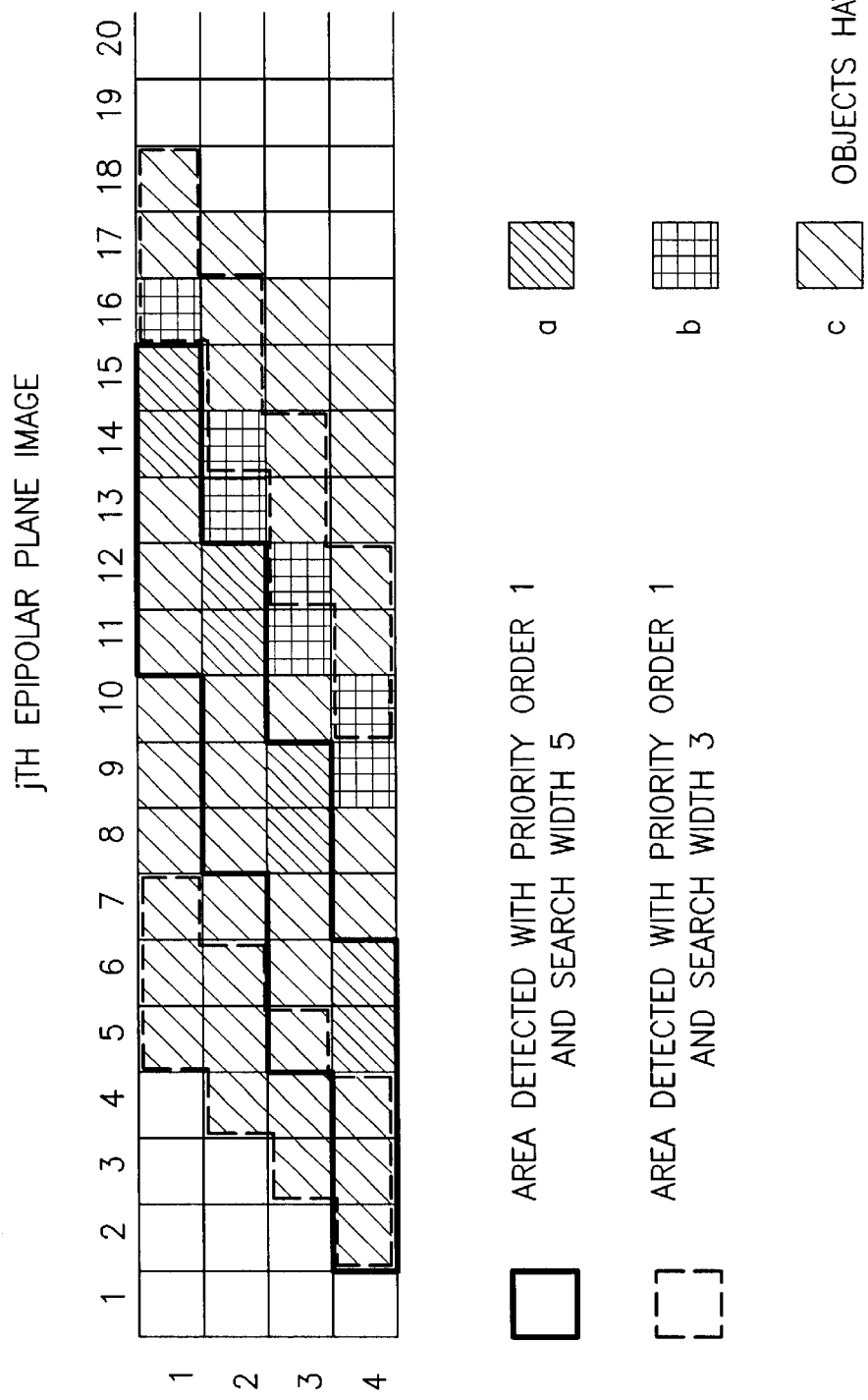
FIG. 24 is a view for explaining an interpolation processing algorithm.
Figure 25:
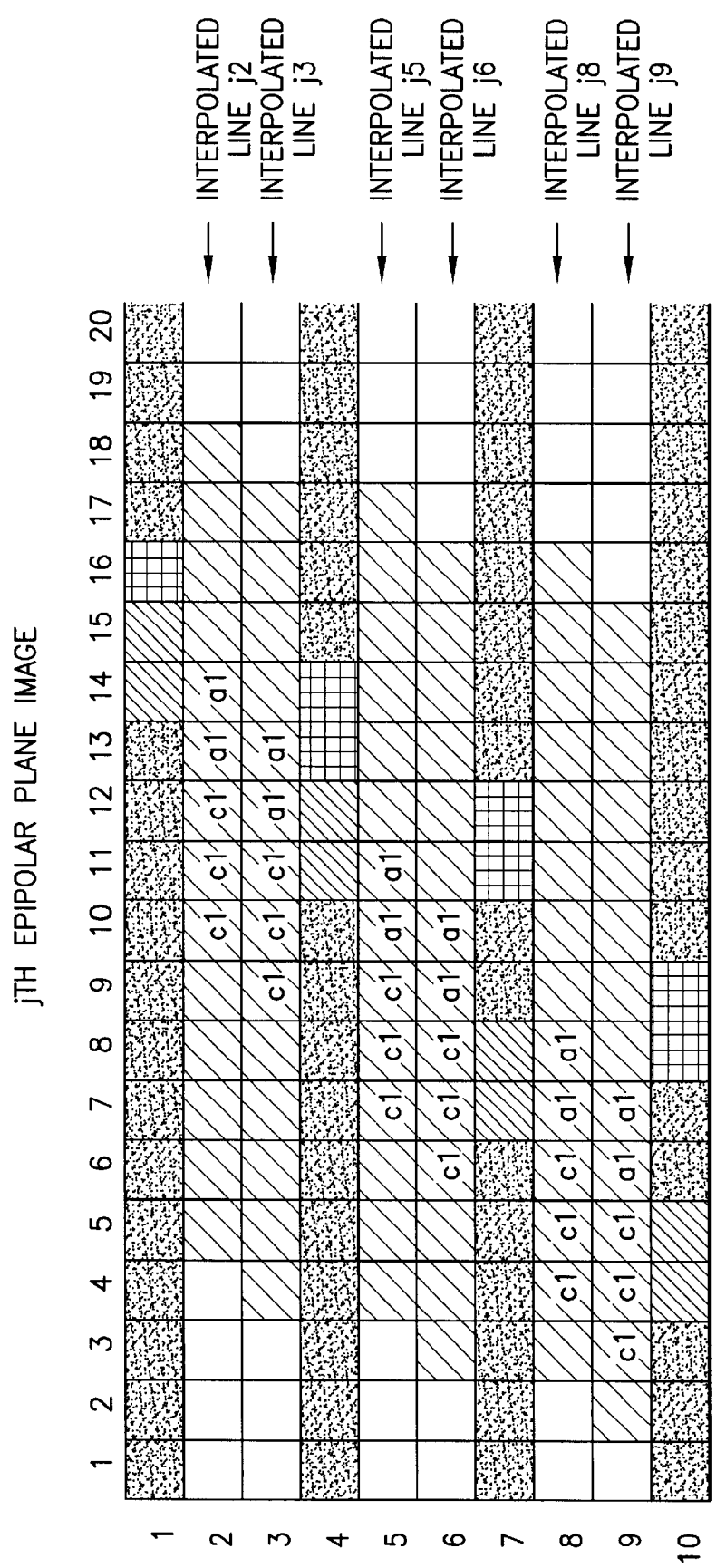
FIG. 25 is a view for explaining the interpolation processing algorithm.

FIG. 24 shows the jth EPI. Reference symbols a, b, and c respectively denote pixel values. The area enclosed with the thick solid line represents a portion detected as a parallelogram area having a width of 5, and the area enclosed with the thick dotted line represents a portion detected as a parallelogram area having a width of 3. A case wherein n images are interpolated between input images at equal intervals will be described. For the sake of descriptive convenience, n=2. Consider the jth EPI. As shown in FIG. 25, two lines may be interpolated between the respective lines of the EPI. As the pixel value of an interpolated line on a straight line connecting corresponding points of an original image, the average value of the corresponding points on the straight line may be set. For this purpose, the following processing B1 to B4 is performed.

B1. Consider a straight line connecting corresponding points of priority order 1. The pixel value of an interpolated line on this straight line is set to the average value of the pixel values of the original image on the straight line. If, however, the corresponding points are detected as a straight line (parallelogram area) having a width, a plurality of straight lines are processed together. The parallelogram area having a width of 5 in FIG. 24 is regarded as five parallel straight lines "cccaa" or a straight line having a width of five pixels. As shown in FIG. 25, therefore, in interpolating a parallelogram area, an intersecting portion between interpolated lines and a parallelogram is filled with an array of average values (cccaa in this case) of the straight lines constituting the parallelogram area.

B2. When the processing of the corresponding points of priority order 1 is completed, processing of corresponding points of priority order 2 is performed. Although this processing is basically the same as that of B1, pixels which have been interpolated in the processing of B1 are not processed.

B3. When the processing of the corresponding points of priority order 2 is completed, processing of corresponding points of priority order 3 is started. Similar to the processing of B2, pixels having undergone interpolation processing are not processed. Subsequently, processing is performed up to corresponding points of the last priority order in the same manner as described above.

B4. With regard to pixels which are not interpolated even after the processing of B1 to B3, interpolation is performed from neighboring pixels. The methods for this processing include a method of using the average value of the neighboring pixel values, and a method of directly using the value of the nearest pixel.

B5. The processing of B1 to B4 is performed for j=1 to ny, and an interpolated image is obtained by using j2, j3, j5, j6, j8, and j9. In this case, as shown in FIG. 25, the lines interpolated by the processing of B1 to B4 are respectively represented by j2, j3, j5, j6, j8, and j9.

Figure 26:
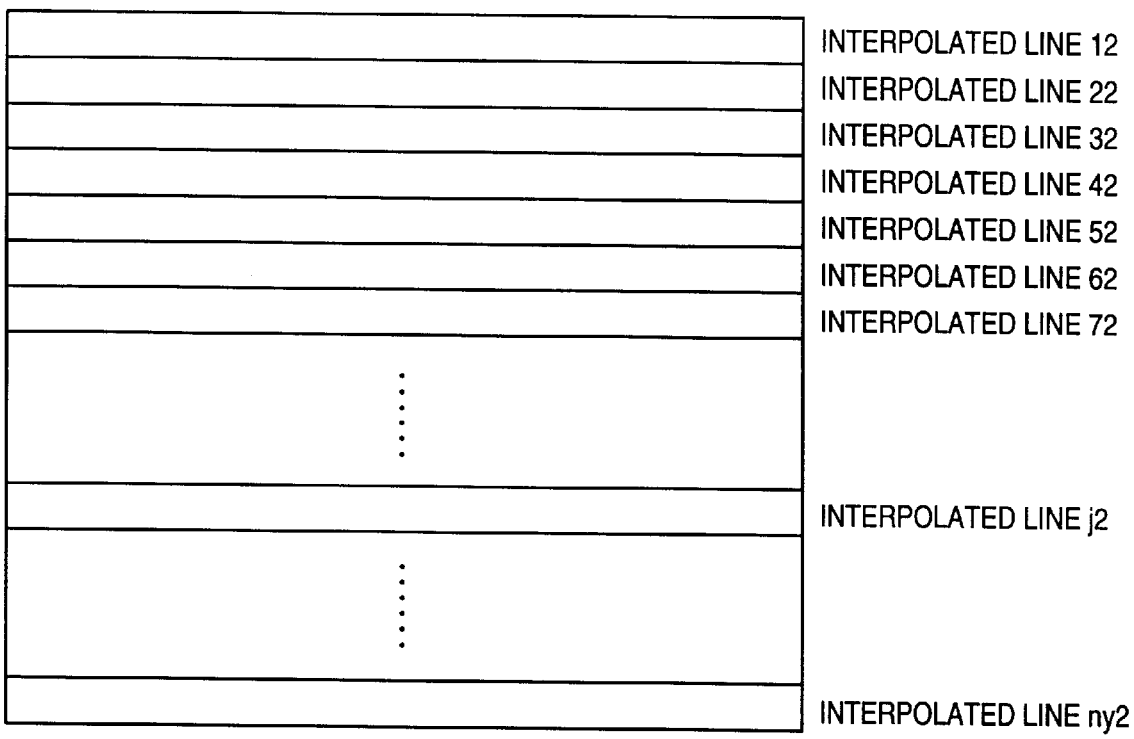
FIG. 26 is a view for explaining the interpolation processing algorithm.

For example, interpolated image 2 can be constructed by arranging the interpolated lines j2 (j=1 to ny), as shown in FIG. 26. The same processing is performed for interpolated images 3, 5, 6, 8, and 9.

By generating an interpolated image from many input images using the above arrangement and method, corresponding points which cannot be obtained from two images can be detected. The interpolation precision therefore can be improved. Since search parameters using photographing parameters can be automatically determined even in corresponding point search processing, the search processing can be performed at a high speed. In addition, since corresponding points are obtained from many images, the problem of occlusion can be solved, as described above. Furthermore, since the correspondence relationship between pixels at the respective viewpoints is preferentially detected by matching of patterns including adjacent pixels instead of matching in units of pixels, more accurate corresponding point detection can be realized, thereby suppressing a deterioration in the image quality of an image formed by interpolation.

The above description has been made without considering the vertical disparity. However, an image can also be generated in consideration of the vertical disparity in the following manner. Multi-viewpoint images photographed from photographing viewpoints arranged at large intervals on a plane in the form of a lattice are held. These multi-viewpoint images are subjected first to inter-viewpoint interpolation in the lateral direction. Inter-viewpoint interpolation is then performed in the vertical direction.

Sixth Embodiment

A method of increasing the processing speed of a corresponding point search unit in the image processing apparatus of the present invention will be described below.

This embodiment can be realized by performing straight line search processing from the first line to the last line of an epipolar plane image in the corresponding point search unit in the fourth embodiment instead of performing only search processing from the first line to the last line. In this case, straight line search processing can be performed by inverting the signs of search parameters including a search range, a search pitch, and the inclination of a straight line.

Seventh Embodiment

In this embodiment, the image processing apparatus of the above embodiment is applied to an image display apparatus of a head-mounted display (HMD) type which is designed such that the display screen 1 is fixed to the head of the user.

In the arrangement of this embodiment, only the processing contents of the view direction parameter calculation unit 10 are replaced with the following processing. A description about the vertical disparity will be omitted.

Figure 27:
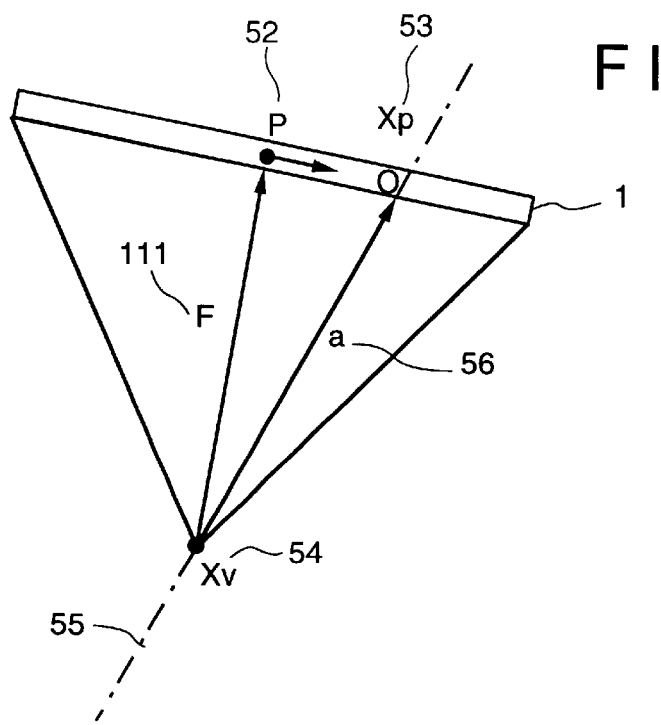
FIG. 27 is a view showing the calculation principle of a view direction parameter calculation unit.

FIG. 27 shows the calculation principle of a view direction parameter calculation unit 10 in this embodiment. Reference numeral 1 denotes a display screen; 52, a vector (display screen vector p) having a length equal to the pixel pitch of the display screen 1 and an inclination equal to the inclination of the display screen 1; 53, a target pixel position (position vector Xp) on the display screen 1; 54, the viewpoint position (position vector Xv) of the user; 111, a vector (front surface vector F) extending from the viewpoint position 54 to the central point of the display screen 1; 55, a view direction corresponding to the target pixel position 53; and 56, a view direction vector a representing the inclination of the view direction 55.

The processing in the view direction parameter calculation unit 10 of this embodiment will be described below with reference to FIG. 27. In the display apparatus of the HMD type, a viewpoint detector 2 detects an inclination in the direction of the front surface, i.e., the inclination of the front surface vector 111, in addition to the viewpoint position 54 of the user. The inclination of the display screen vector 52 is determined by the inclination of the front surface vector 111 (normally a right angle). The distance from the viewpoint position 54 to the display screen 1, the length of the front surface vector 111, and the pixel pitch, i.e., the length of the display screen vector 52 are fixed values determined by the shape of the HMD. These values are held in the display parameter holding unit 4. The target pixel position 53 and the view direction vector 56 are calculated by the following equations according to the geometric pattern in FIG. 27:

$$Xp = Xv + F + i \cdot p$$

$$a = Xp - Xv \qquad (12)$$

With the above arrangement, the display apparatus of the HMD type becomes an image display apparatus which allows arbitrary movement of the viewpoint to display a multi-viewpoint.

Even if a display apparatus of a cockpit type, in which the relative positional relationship between the fixed display screen 1 and the viewpoint position 54 of the user is stationary, is used instead of using the display apparatus having the display screen 1 which is to be fixed to the head of the user, an image display apparatus which allows arbitrary movement of the viewpoint in performing a display operation can be realized by the same processing in the view direction parameter calculation unit 10 as that in this embodiment. In this case, instead of the viewpoint detector 2, a viewpoint position input device designed to move the viewpoint position 54 in a reference coordinate system with a handle or the like is used.

Figure 1:
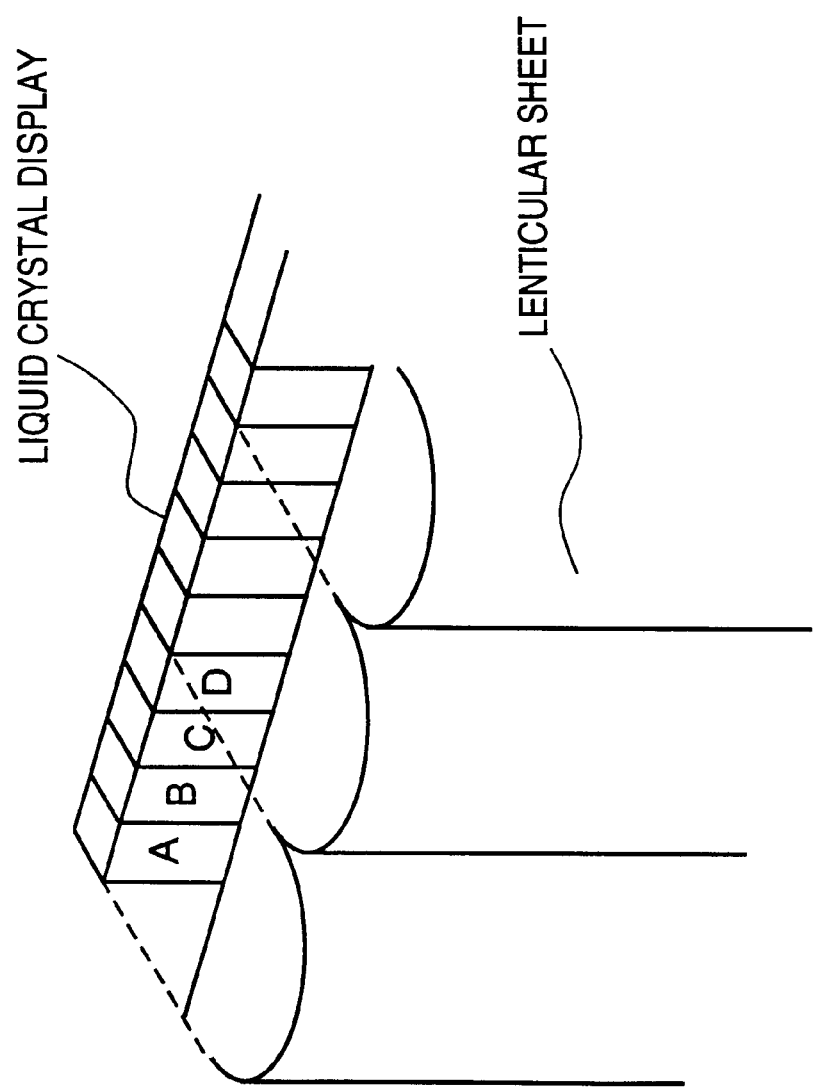
FIG. 1 is a perspective view for explaining a lenticular lens display.

Note that the display screen 1 is constituted by a liquid crystal display 100 and a lenticular sheet 101 like those shown in FIG. 1.

In each embodiment described above, multi-viewpoint images photographed in advance and images obtained from the multi-viewpoint images by inter-viewpoint interpolation are held in the multi-viewpoint image database 3. If this arrangement is replaced with a multi-eye television camera which can acquire multi-viewpoint images in real time, a real-time, arbitrary viewpoint image photographing/display system can be realized.

The present invention may be applied to a single image processing apparatus or system equipment such as a multi-viewpoint television system, a multi-viewpoint video phone terminal system, or a multi-viewpoint video conference system. In addition, the present invention can be applied to a composite apparatus constituted by a combination of a computer and an image processing apparatus.

As has been described above, according to the present invention, images photographed from a plurality of positions are input, and the input multi-viewpoint image data is decomposed into an EPI. A straight line is detected on the basis of the width of a straight line on this EPI, and corresponding points between images are detected from this straight line. An image which should be obtained by performing a photographing operation from a different position is generated by using the detected corresponding points. With this arrangement, even in a case wherein the forward/backward relationship of images of an object is reversed, or a fine pattern is distorted as in the prior art, an interpolated image can be generated with high precision.

According to the present invention, by automatically determining corresponding search parameters, the speed of interpolation processing can be increased by detection of a straight line having a width. In addition, images corresponding to movement of the viewpoint in the back-and-forth direction are constructed by using many images obtained by interpolation processing and multi-viewpoint images which are photographed while the viewpoint is moved at sufficiently small intervals, thereby allowing movement of the viewpoint in the back-and-forth direction, which cannot be handled by the prior art.

The present invention can be applied to a system constituted by a plurality of devices or to an apparatus comprising a signal device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
   multi-viewpoint image input step for inputting images obtained from a plurality of viewpoint positions arranged on different straight lines;
   storing step of storing images input in said multi-viewpoint image input step;
   detection step for detecting a viewpoint position and a view direction of the user; and
   image generation step for generating a virtual image viewed from the detected viewpoint, the virtual image being generated on the basis of images adaptively selected from the images stored in said storing step in accordance with the detected viewpoint position and the direction detected in the detection step.

2. The method according to claim 1, wherein an angle at which the different straight lines intersect is not more than a view angle of a camera disposed at the viewpoint position.

3. The method according to claim 2, wherein at the multi-viewpoint image input step, an image-sensing operation is performed by using a plurality of cameras arranged on a straight line while rotating said cameras about a middle point of a line segment connecting lens centers of said cameras, thereby acquiring images equivalent to images sensed by a plurality of sets of cameras.

4. The method according to claim 1, wherein the images obtained from the plurality of viewpoint positions arranged on the different straight lines are stored in a predetermined database, and
   at the multi-viewpoint image input step, images from said database are inputted.

5. The method according to claim 1, wherein at the image generation step, the virtual image viewed from the predetermined viewpoint is generated on the basis of the detected predetermined viewpoint position and the view direction by causing a corresponding pixel, on the image sensed from the nearest viewpoint to an intersecting point between a straight line passing the predetermined viewpoint and a pixel point of the virtual image to be generated and one of the different straight lines, to coincide with the pixel point of the virtual image.

6. The method according to claim 1, wherein the image generation step comprises:
   view direction vector generation step for generating a view direction vector v from the viewpoint position corresponding to a pixel on a display screen of a display apparatus on the basis of the viewpoint position Vp detected in the detection step, the view direction, and a physical characteristic parameter of said display screen;
   photographing viewpoint calculation step for selecting a viewpoint position Rp as a selected photographing viewpoint which corresponds a minimum angle of angles q between the view direction vector v and focal vectors at a plurality of viewpoint positions arranged on a straight line, of the different straight lines, which intersects the view direction vector v, on the basis of the viewpoint position Vp and the view direction vector v;
   pixel position calculation step for calculating a pixel position Ru, on the display screen, which corresponds to the viewpoint position Rp on the basis of the viewpoint position Rp and an inclination vector q and a focal vector f, of said display screen, which corresponds to the viewpoint position Rp;
   pixel selection step for selecting an image input in the multi-viewpoint image input step which has a viewpoint position nearest to the viewpoint position Rp, and selecting a pixel on the selected image which is located at a position nearest to the pixel position Ru; and
   image display step for displaying an image on the basis of the selected pixel.

7. The method according to claim 6, wherein the physical characteristic parameter of said display screen includes an inclination vector P representing an inclination of said display screen, and end point coordinates Vs of said display screen.

8. The method according to claim 1, wherein at the image generation step, the virtual image viewed from the predetermined viewpoint is generated on the basis of the detected predetermined viewpoint and the view direction by causing a corresponding pixel, on the image sensed from the same viewpoint as an intersecting point between a straight line passing the predetermined viewpoint and a pixel point of the virtual image to be generated and one of the different straight lines, to coincide with the pixel point of the virtual image and interpolating images obtained from the plurality of viewpoint positions on the straight line including the intersecting point to generate an interpolated image with the intersecting point being a viewpoint and setting a corresponding pixel on the interpolated image as a pixel on the virtual image.

9. The method according to claim 8, wherein the interpolated image is generated on the basis of straight line detection performed by searching for corresponding points using images, as an epipolar plane image, obtained from the plurality of viewpoint positions on the straight line including the intersecting point.

10. The method according to claim 8, wherein the interpolated image is generated by determining corresponding points on the epipolar plane image on the basis of detection of an array of straight lines which have a width on the epipolar plane image and generating the interpolated image on the basis of the array of the straight lines each connecting corresponding points.

11. The method according to claim 10, wherein the detection of the array of the straight lines is performed by obtaining an array of adjacent straight lines, each of which connects points having almost the same intensity on the epipolar plane image, which have almost the same inclination and determining corresponding points on the basis of selecting a array of straight lines having a larger width.

12. An image processing method comprising:
array detection step for detecting a plurality of arrays of straight lines having predetermined widths on an epipolar plane image constituted by a plurality of images sensed from a plurality of viewpoint positions; and
corresponding point determination step for determining corresponding points by selecting an array of straight lines having a wider width from the plurality of arrays.

13. The method according to claim 12, further comprising the interpolation step for generating an interpolated image which is seen from a viewpoint other than the viewpoints from which the plurality of images are image-sensed, on the basis of corresponding points determined in the corresponding point determination step and straight lines corresponding to the corresponding points.

14. The method according to claim 12, wherein the plurality of images sensed from the plurality of viewpoints are images sensed from a plurality of viewpoints arranged on different straight lines.

15. The method according to claim 14, wherein the angle at which the different lines intersect is not more than a view angle of a camera disposed at the viewpoint.

16. The method according to claim 14, wherein the plurality of images sensed from the plurality of viewpoints are images sensed by using a plurality of cameras arranged on a straight line while rotating said cameras about a middle point of a line segment connecting lens centers of said cameras.

17. The method according to claim 12, further comprising the display step for displaying an interpolated image generated in the interpolation step.

18. An image processing apparatus comprising:
multi-viewpoint image input means for inputting images obtained from a plurality of viewpoint positions arranged on different straight lines;
storing means for storing images input in said multi-viewpoint image input means;
detection means for detecting a viewpoint position and a view direction of the user; and
image generating means for generating a virtual image viewed from the detected viewpoint, the virtual image being generated on the basis of images adaptively selected from the image stored in said storing means, the detected viewpoint position and the direction detected in the detection step.

19. The apparatus according to claim 18, wherein an angle at which the different straight lines intersect is not more than a view angle of a camera disposed at the viewpoint position.

20. The apparatus according to claim 19, wherein at the multi-viewpoint image input means, an image-sensing operation is performed by using a plurality of cameras arranged on a straight line while rotating said cameras about a middle point of a line segment connecting lens centers of said cameras, thereby acquiring images equivalent to images sensed by a plurality of sets of cameras.

21. The apparatus according to claim 18, wherein the images obtained from the plurality of viewpoint positions arranged on the different straight lines are stored in a predetermined database, and
at the multi-viewpoint image input means, images from said database are inputted.

22. The apparatus according to claim 18, wherein at the image generation means, the virtual image viewed from the predetermined viewpoint is generated on the basis of the detected predetermined viewpoint position and the view direction by causing a corresponding pixel, on the image sensed from the nearest viewpoint to an intersecting point between a straight line passing the predetermined viewpoint and a pixel point of the virtual image to be generated and one of the different straight lines, to coincide with the pixel point of the virtual image.

23. The apparatus according to claim 18, wherein the image generation means comprising:
view direction vector generation means for generating a view direction vector v from the viewpoint position corresponding to a pixel on a display screen of a display apparatus on the basis of the viewpoint position Vp detected in the detection means, the view direction, and a physical characteristic parameter of said display screen;
photographing viewpoint calculation means for selecting a viewpoint position Rp as a selected photographing viewpoint which corresponds a minimum angle of angles q between the view direction vector v and focal vectors at a plurality of viewpoint positions arranged on a straight line, of the different straight lines, which intersects the view direction vector v, on the basis of the viewpoint position Vp and the view direction vector v;
pixel position calculation means for calculating a pixel position Ru, on the display screen, which corresponds to the viewpoint position Rp on the basis of the viewpoint position Rp and an inclination vector q and a focal vector f, of said display screen, which correspond to the viewpoint position Rp;
pixel selection means for selecting an image input in the multi-viewpoint image input means which has a viewpoint position nearest to the viewpoint position Rp, and selecting a pixel on the selected image which is located at a position nearest to the pixel position Ru; and
image display means for displaying an image on the basis of the selected pixel.

24. The apparatus according to claim 23, wherein the physical characteristic parameter of said display screen includes an inclination vector P representing an inclination of said display screen, and end point coordinates Vs of said display screen.

25. The apparatus according to claim 18, wherein at the image generation means, the virtual image viewed from the predetermined viewpoint is generated on the basis of the detected predetermined viewpoint and the view direction by causing a corresponding pixel, on the image sensed from the same viewpoint as an intersecting point between a straight line passing the predetermined viewpoint and a pixel point of the virtual image to be generated and one of the different straight lines, to coincide with the pixel point of the virtual image and interpolating images obtained from the plurality of viewpoint positions on the straight line including the intersecting point to generate an interpolated image with the intersecting point being a viewpoint and setting a corresponding pixel on the interpolated image as a pixel on the virtual image.

26. The apparatus according to claim 25, wherein the interpolated image is generated on the basis of straight line detection performed by searching for corresponding points using images, as an epipolar plane image, obtained from the plurality of viewpoint positions on the straight line including the intersecting point.

27. The apparatus according to claim 25, wherein the interpolated image is generated by determining corresponding points on the epipolar plane image on the basis of detection of an array of straight lines which have a width on the epipolar plane image and generating the interpolated image on the basis of the array of the straight lines each connecting corresponding points.

28. The apparatus according to claim 27, wherein the detection of the array of the straight lines is performed by obtaining an array of adjacent straight lines, each of which connects points having almost the same intensity on the epipolar plane image, which have almost the same inclination and determining corresponding points on the basis of selecting a array of straight lines having a larger width.

29. An image processing apparatus comprising:
  array detection means for detecting a plurality of arrays of straight lines having predetermined widths on an epipolar plane image constituted by a plurality of images sensed from a plurality of viewpoint positions; and
  corresponding point determination means for determining corresponding points by selecting an array of straight lines having a wider width from the plurality of arrays.

30. The apparatus according to claim 29, further comprising the interpolation means for generating an interpolated image which is seen from a viewpoint other than the viewpoints from which the plurality of images are sensed, on the basis of corresponding points determined in the corresponding point determination means and straight lines corresponding to the corresponding points.

31. The apparatus according to claim 29, wherein the plurality of images sensed from the plurality of viewpoints are images sensed from a plurality of viewpoints arranged on different straight lines.

32. The apparatus according to claim 31, wherein the angle at which the different lines intersect is not more than a view angle of a camera disposed at the viewpoint.

33. The apparatus according to claim 31, wherein the plurality of images sensed from the plurality of viewpoints are images sensed by using a plurality of cameras arranged on a straight line while rotating said cameras about a middle point of a line segment connecting lens centers of said cameras.

34. The apparatus according to claim 29, further comprising the display means for displaying an interpolated image generated in the interpolation means.

35. An image generating apparatus comprising:
  a storage device which stores a plurality of images picked up at a plurality of viewpoint positions;
  an input device which inputs an imaginary viewpoint position; and
  an image generating device which generates an image viewed from the imaginary viewpoint position of the basis of images adaptively selected from the plurality of images stored in said storage device according to the imaginary viewpoint position and a viewing direction from the imaginary viewpoint position.

36. An apparatus according to claim 35, wherein a plurality of images obtained by picking up images of an object at a plurality of viewpoint positions which are on a predetermined curved line are stored into said storage device.

37. An apparatus according to claim 36, wherein said curved line comprises a straight line.

38. An apparatus according to claim 36, wherein said image generating device sets an imaginary image plane at said imaginary viewpoint position, retrieves an image out of said storage device corresponding to an image at a position where the predetermined curved line intersects a straight line connecting said imaginary viewpoint position and an arbitrary point of the object, and generates an image on the imaginary image plane.

39. An apparatus according to claim 38, wherein said image generating device generates image data for each pixel of image on the imaginary image plane, on the basis of images retrieved from said storage device.

40. An apparatus according to claim 39, wherein said image generating device further comprises interpolating means for interpolating between images retrieved from said storage device.

41. An apparatus according to claim 38, wherein in said image generating step, image data is generated for each pixel of the image on the imaginary image plane, on the basis of images retrieved from said storage device.

42. An image generating method comprising:
  the storing step of storing a plurality of images picked up at a plurality of viewpoint positions;
  the input step of inputting an imaginary viewpoint position; and
  the image generating step of generating an image viewed from the imaginary viewpoint position on the basis of images adaptively selected from the plurality of images stored in said storage device according to the imaginary viewpoint position and a viewing direction from the imaginary viewpoint position.

43. An apparatus according to claim 42, wherein said storing step comprises:
  picking up a plurality of images of an object at a plurality of viewpoint positions which are on a predetermined curved line; and
  storing the plurality of images of the object into said storage device.

44. An apparatus according to claim 43, wherein said image generating step comprises the steps of:
  setting an imaginary image plane at said imaginary viewpoint position;
  retrieving images out of said storage device corresponding to an image at a position where the predetermined curved line intersects a straight line connecting said imaginary viewpoint position and an arbitrary point of the object; and
  generating an image on the imaginary image plane.

* * * * *

UNITED STATES PATENT AND TRADEMARK OFFICE
CERTIFICATE OF CORRECTION

PATENT NO.    : 6,608,622 B1
DATED         : August 19, 2003
INVENTOR(S)   : Akihiro Katayama et al.

It is certified that error appears in the above-identified patent and that said Letters Patent is hereby corrected as shown below:

<u>Title page,</u>
Item [56], References Cited, OTHER PUBLICATIONS, please add -- Construction of Intermediate Pictures for a Multiview 3D System" by Jin Lui, et al., SPIE Vol. 1669 Stereoscopic Displays and Applications III (1992), pp 10-19.* --

Signed and Sealed this

Thirtieth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,608,622 B1
DATED : August 19, 2003
INVENTOR(S) : Katayama et al.

It is certified that error appears in the above-identified patent and that said Letters Patent is hereby corrected as shown below:

Column 5,
Line 54, delete "$\ell_o$, and $\ell_2$," and insert -- $\ell_o$, $\ell_1$ and $\ell_2$. --

Column 8,
Line 24, delete "v=VuVp" and insert -- v=Vu-Vp --
Line 29, delete "bellow" and insert -- below --

Column 10,
Line 56, delete "line of the image" and insert -- line of the ith image --

Column 17,
Lines 47 and 49, delete "calorimetric" and insert -- colorimetric --

Column 24,
Line 6, delete "in the detection step" and insert -- by said detecting means --

Column 26,
Line 7, delete "position of the" and insert -- position on the --
Line 34, delete "wherein in said" and insert -- wherein said --

Signed and Sealed this

Fifth Day of April, 2005

JON W. DUDAS
*Director of the United States Patent and Trademark Office*